United States Patent
Click

(10) Patent No.: US 9,420,761 B2
(45) Date of Patent: Aug. 23, 2016

(54) DUAL SHEET DETACHABLE HOCK PROTECTOR

(71) Applicant: Shari Click, Santa Cruz, CA (US)

(72) Inventor: Shari Click, Santa Cruz, CA (US)

( * ) Notice: Subject to any disclaimer, the term of this patent is extended or adjusted under 35 U.S.C. 154(b) by 292 days.

(21) Appl. No.: 14/290,953

(22) Filed: May 29, 2014

(65) Prior Publication Data

US 2014/0290588 A1  Oct. 2, 2014

Related U.S. Application Data

(63) Continuation-in-part of application No. 13/372,476, filed on Feb. 13, 2012, now abandoned.

(51) Int. Cl.
*A01K 13/00* (2006.01)

(52) U.S. Cl.
CPC .................... *A01K 13/007* (2013.01)

(58) Field of Classification Search
CPC ... A01K 13/00; A01K 13/006; A01K 13/007; B68C 5/00; A61D 9/00
See application file for complete search history.

(56) References Cited

U.S. PATENT DOCUMENTS

| | | |
|---|---|---|
| 348,003 A | 8/1886 | Fry |
| 537,607 A | 4/1895 | Green |
| 2,449,410 A | 9/1948 | Polinsky |
| 2,603,786 A | 7/1952 | Peterson Haides |
| 3,193,984 A | 7/1965 | Schubert |
| 3,209,516 A | 10/1965 | Hyman |
| 3,209,517 A | 10/1965 | Hyman |
| 3,801,984 A | 4/1974 | Kanicki |
| 4,342,185 A | 8/1982 | Pellew |
| 4,424,809 A | 1/1984 | Yovankin |
| 4,548,026 A * | 10/1985 | Shidner ............... A01K 13/007 168/2 |
| 4,685,278 A | 8/1987 | Minusoka |
| 4,695,496 A | 9/1987 | Lee |
| 4,834,079 A | 5/1989 | Benckhuijsen |
| 4,974,398 A | 12/1990 | Kaski |
| 5,389,061 A | 2/1995 | Nor |
| 5,676,094 A | 10/1997 | Gun-Munro |
| 5,711,029 A | 1/1998 | Visco et al. |
| 5,871,458 A * | 2/1999 | Detty ....................... A61D 9/00 54/82 |
| 5,926,843 A | 7/1999 | Winchester |
| 6,390,026 B1 | 5/2002 | Sollock |
| 2004/0055543 A1 | 3/2004 | Clement |
| 2008/0168589 A1 | 7/2008 | Richards |

FOREIGN PATENT DOCUMENTS

| | | |
|---|---|---|
| GB | 2265812 A | 10/1993 |
| JP | 10277066 A | 10/1998 |

OTHER PUBLICATIONS

Machine translation of JP 10277066 to Taru, published Oct. 1998.

* cited by examiner

*Primary Examiner* — Kathleen Alker
(74) *Attorney, Agent, or Firm* — Patrick Reilly

(57) ABSTRACT

A device for protecting the skin of an animal from damage, abrasion and/or moisture is provided. A first version includes an elastic element attached to a pair of protective sheets. The elastic element in combination with the protective sheets encircles an animal limb proximate to a hock, wherein the protective sheets are positioned over the hock. One or more protective sheets may be partially curved to form a cup shape for at least partially enclosing the hock. A moisture absorbent material may be attached to and disposed between the skin of the animal limb and both the elastic sheet and the protective sheets. The absorbent material may be a wicking material, such as a moisture wicking fleece. The protective sheet may optionally be asymmetric as positioned about a sagittal plane central to the hock.

19 Claims, 24 Drawing Sheets

DUAL SHEET DETACHABLE HOCK PROTECTOR

CO-PENDING PATENT APPLICATION

This Nonprovisional patent application is a Continuation-in-Part application to Nonprovisional patent application Ser. No. 13/372,476, filed on Feb. 13, 2012 by inventor Shari Lee Click and titled "ANIMAL HOCK PROTECTOR".

Nonprovisional patent application Ser. No. 13/372,476 is hereby incorporated by reference in its entirety and for all purposes, to include claiming benefit of the priority date of filing of Nonprovisional patent application Ser. No. 13/372,476.

FIELD OF THE INVENTION

The present invention relates generally to animal husbandry and the care and maintenance of animals. The present invention more particularly relates to the protection of living animal skin from abrasion and infection.

BACKGROUND OF THE INVENTION

The maintenance and husbandry of animals includes concerns regarding the threat of skin infections and abrasions. The prior art includes leggings and pads that are applied to cushion limbs of animals from contact with or exposure to objects and conditions that can cause or aggravate skin eruptions, open wounds, or blisters.

The prior art provides efforts to protect elements of animal physiology related to joints. In one exemplary area of prior art, protective devices for hock joints of large animals are provided that generally have means of securing a protective pad above and below the hock joint (hereafter "the hock"). Certain prior art hock protectors employ a semi-cylindrical shape and are made as one-size-fits-all. Prior art animal skin protectors of this type have the drawbacks of (1.) restricting the free movement of the target animal joint; (2.) being prone to changing position on the target joint which can render the protector ineffective by undesirable repositioning; (3.) being cumbersome and difficult to install; (4.) being prone to simply falling off and away from the animal; and (5.) failing to allow sufficient airflow under the pad to control moisture or animal sweat disposed on the animal skin under the pad.

Prior art uses of ribs to hold a padded device in place can create additional rub points in areas where the target animal is generally likely to suffer sores. Furthermore, prior art leg protectors that have been designed for close contact with an animal leg to prevent slippage can contribute to and cause a retention of heat on animal skin, such as near an animal joint, for example a hock. A one-size-fits-all approach to prior art devices presents additional drawbacks in enabling sustained positioning relative to a target animal joint because there are variances within a species of circumferences of joints and limbs. In one exemplary application, it is known in the art that an adult horse in a normal range of motion may cause approximately a one-inch plus or minus 0.5 inch or more variance in the external circumference of a hock joint.

The horse hock is fundamentally important to the performance of a horse in motion as well a potential site of conditions that cause lameness. There is therefore a long-felt need for improved methods and devices for sustainable positioning a protective device relative to a selected area of an animal's skin, limb or joint.

SUMMARY OF THE INVENTION

This and other objects of the present invention are made obvious in light of this disclosure, wherein a device is provided for attachment to a target animal for the purpose of protecting the skin and underlying flesh of the target animal. According to a first aspect of the method of the present invention, an elastic band or an elastic extension is attached to a pair of coupled protective sheets that in combination are configured to encircle a limb or trunk of the target animal. The protective sheets may extend from the elastic band or elastic extension to protect an area of the target animal, for example, a skin surface or a skin area proximate to an animal hock or other skeletal joint.

According to other aspects of the present invention, a lining is provided that may be or comprise an absorbent and/or moisture wicking fabric. The lining may be gathered and then attached to the protective sheet and/or elastic extension. The gathered fabric may then flatten against one or more protective sheets and elastic extension as the protective sheet and the elastic extension are stretched by movement of the hock. The gathering of the fabric reduces or eliminates impedance by the lining in the stretching of the elastic extension and protective sheet as the hock passes through a full range of motion.

INCORPORATION BY REFERENCE

All publications mentioned herein are incorporated herein by reference to disclose and describe the methods and/or materials in connection with which the publications are cited. All publications, patents, and patent applications mentioned in this specification are herein incorporated by reference in their entirety and for all purposes to the same extent as if each individual publication, patent, or patent application was specifically and individually indicated to be incorporated by reference.

Such incorporations include U.S. Nonprovisional patent application Ser. No. 12/799,245, filed on Mar. 20, 2010 by inventor Shari Lee Click and titled "IMPROVED ANIMAL HOCK PROTECTOR"; U.S. Pat. No. 6,390,026 (inventor: Sollock, H.; issued on May 21, 2002) titled "Roping steer leg saver"; U.S. Pat. No. 5,389,061 (inventor: Nor, F.; issued on February 1995) titled "Hockwrap"; U.S. Pat. No. 4,974,398 (inventor: Kaski, L.; issued on Dec. 4, 1990) titled "Weight strap for a horse's leg"; U.S. Pat. No. 4,834,079 (inventor: Benckhuijsen; J.; issued on May 30, 1989) titled "Protective cover for legs & joints of hoofed animals"; U.S. Pat. No. 4,342,185 (inventor: Pellew, P.; issued on Aug. 3, 1982) titled "Protective garment for the legs of a quadruped of the horse genus and material for such garment" and U.S. Pat. No. 3,209,516 (inventor: Hyman, L.; issued on Oct. 5, 1965) titled "Hock protector".

The publications discussed or mentioned herein are provided solely for their disclosure prior to the filing date of the present application. Nothing herein is to be construed as an admission that the present invention is not entitled to antedate such publication by virtue of prior invention. Furthermore, the dates of publication provided herein may differ from the actual publication dates which may need to be independently confirmed.

BRIEF DESCRIPTION OF THE FIGURES

These, and further features of various aspects of the present invention, may be better understood with reference to the accompanying specification, wherein.

DETAILED DESCRIPTION

It is to be understood that this invention is not limited to particular aspects of the present invention described, as such may, of course, vary. It is also to be understood that the terminology used herein is for the purpose of describing particular aspects only, and is not intended to be limiting, since the scope of the present invention will be limited only by the appended claims.

Methods recited herein may be carried out in any order of the recited events which is logically possible, as well as the recited order of events.

Where a range of values is provided herein, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the methods and materials are now described.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

Figure 1:
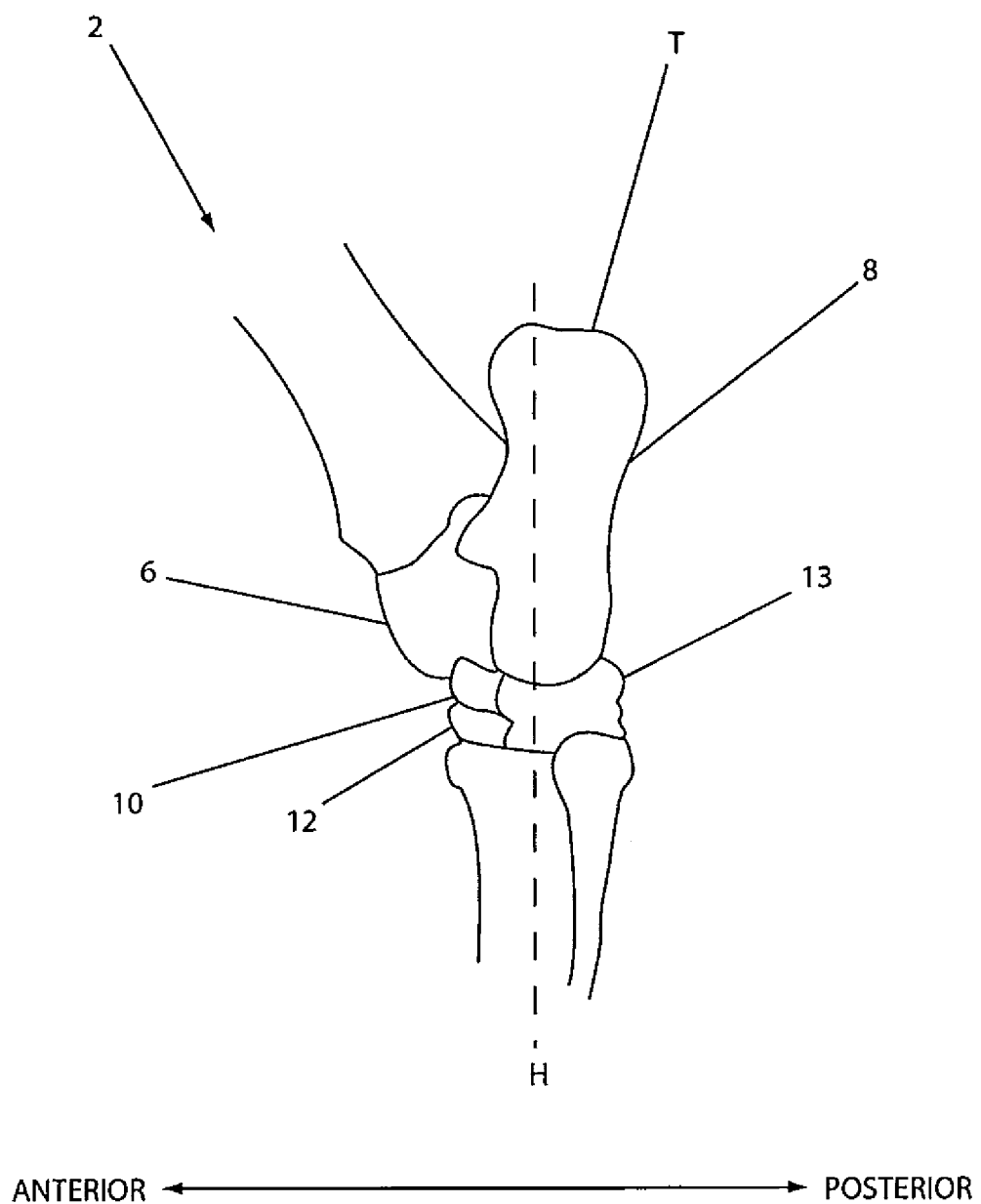
FIG. 1 is a side view of a hock joint of a horse.
Figure 2:
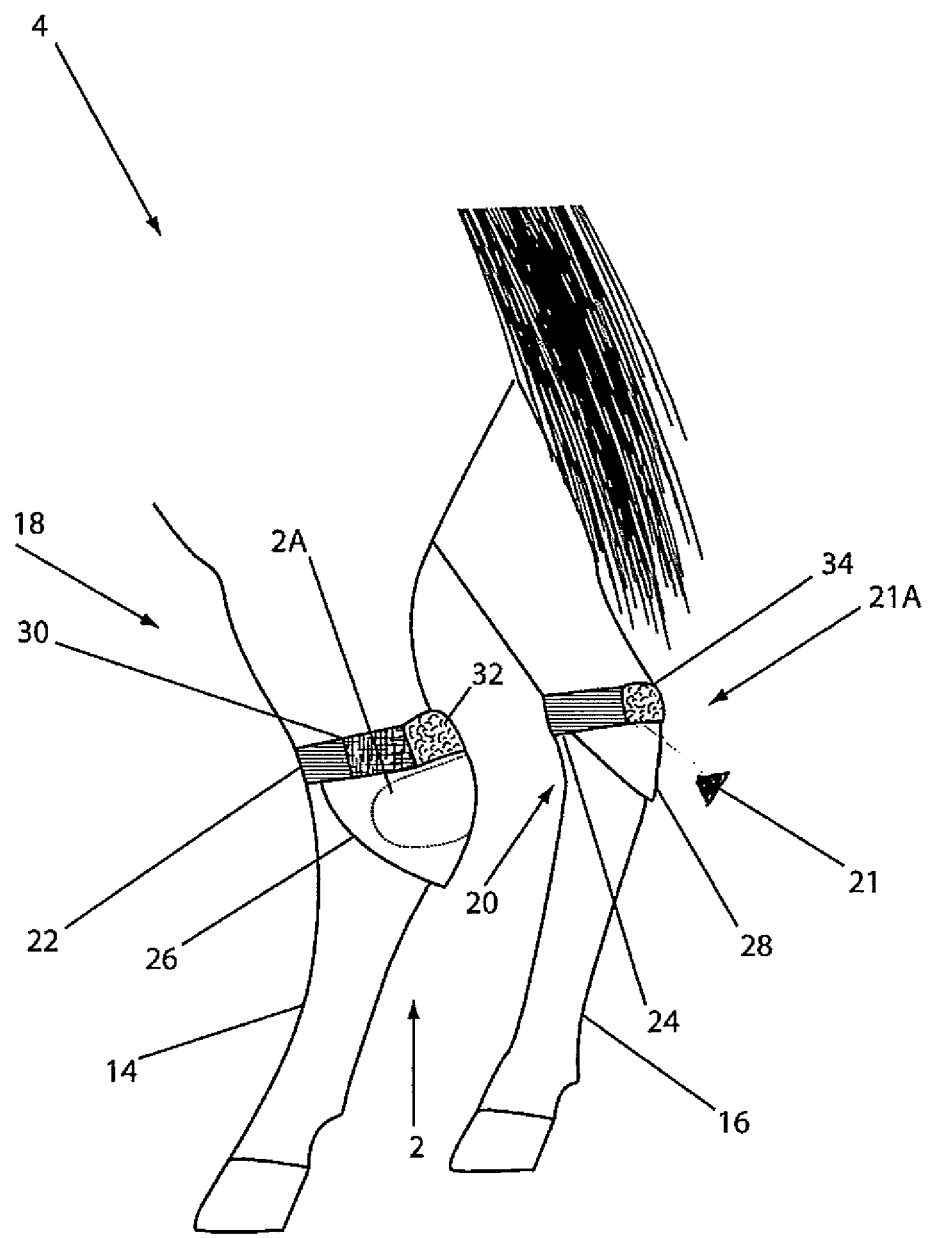
FIG. 2 is a side view of the horse of FIG. 1 showing a right hock protector attached to a right leg of the horse and a left hock protector attached to a left leg of the horse.

Referring now generally to the Figures and particularly to FIG. 1 and FIG. 2, FIG. 1 is a side view of a left hock 2 of a horse 4 of FIG. 2. It is understood that the method of the present invention may be applied to other joints, hocks and skin covered aspects of other animals, such as sheep.

The left hock 2 is a complex joint that includes (a.) the five hock bones indicated by element numbers 6, 8, 10, 12 and 13 and the joints between these hock bones 6, 8, 10, 12 and 13. These bones and joints are arranged in three main layers, namely: (a) an upper (proximal) layer that includes a talus bone 6 and a calcaneus bone 8; (b) a middle layer that includes a central tarsal bone 10; and a lower (distal) layer that includes a first tarsal bone (not shown), a second tarsal bone (not shown) and a third tarsal bone 12. A fourth tarsal bone 13 spans the middle and distal layers of the left hock 2 at the back of the left hock 2. The calcaneus bone 8 (hereafter "the hock bone" 8) extends distally and away from the center of mass of the horse 4. This projection of the hock bone 8 away from a hock centerline H accentuates a danger that the skin area of the horse 4 proximate to the hock bone 8 will suffer from damage and trauma. The hock centerline H passes through a top surface T of the hock bone 8. The area of the left hock 2 that is posterior to the hock centerline H is referred to herein as the "back of the hock".

Referring now generally to the Figures and particularly to FIG. 2, FIG. 2 is a side view of the horse 4 having a left rear leg 14 and a rear right leg 16. A left hock protector 18 is separately attached to the left rear leg 14 and substantially protects a back of the left hock 2. A right hock protector 20 is attached to a right rear leg 16 and substantially covers a back of a right hock 21. The left hock protector 18 is shaped to protect a left skin area 2A of the left hock 2, and the right hock protector 20 is shaped to protect a right skin area 21A of the right hock 21. The left skin area 2A may include some or all horse skin that is within the range of from one inch to more than two inches from the left hock bone 8. Alternatively or additionally, the right skin area 21A may include some or all of horse skin located within the range of from one inch to more than two inches from the right hock bone (not shown) of the right hock 21

Each hock protector 18 and 20 includes an elastic band 22 and 24 that are each coupled to a separate protective sheet 26 and 28. The left protective sheet 26 is preferably sized and shaped to substantially cover the back of the left hock 2 of the left leg 14, wherein more than 50% of the back of the left hock 2 is covered by the left hock protector 18. The right protective sheet 28 is sized and shaped to substantially cover the back of the right hock 21 of the right leg 16, wherein more than 50% of the back of the left hock 21 of the right leg 16 is covered by the right hock protector 20.

The elastic bands 22 and 24 may be or comprise a WE-2™ woven cotton elastic strip marketed by Lea and Sachs, Inc. of Des Plaines, Ill. The protective sheets 26 and 28 are positioned to extend distally from the attached elastic band 22 and 24, preferably in a size and shape suitable to the horse 4. For example, the protective sheet 26 and 28 may be shaped to extend within five inches to seven inches distally from the elastic attachment band, or in other versions, to extend within less than one inch to greater than nine inches from the elastic band.

A hook and loop fastener assembly 30 comprising VEL-CRO™ hook and loop fabric detachably maintains the elastic bands 22 and 24 around each encircled leg 14 and 16. Either elastic band 22 and 24 may optionally be formed to detachably encircle a horse leg 14 and 16 by means of a zipper assembly, a button and buttonhole combination, or other suitable detachable attachment means known in the art.

An external absorbent fabric tongue 32 and 34 extends from an internal side and along an external side of respective and separate protective sheet 26 and 28.

Figure 3:
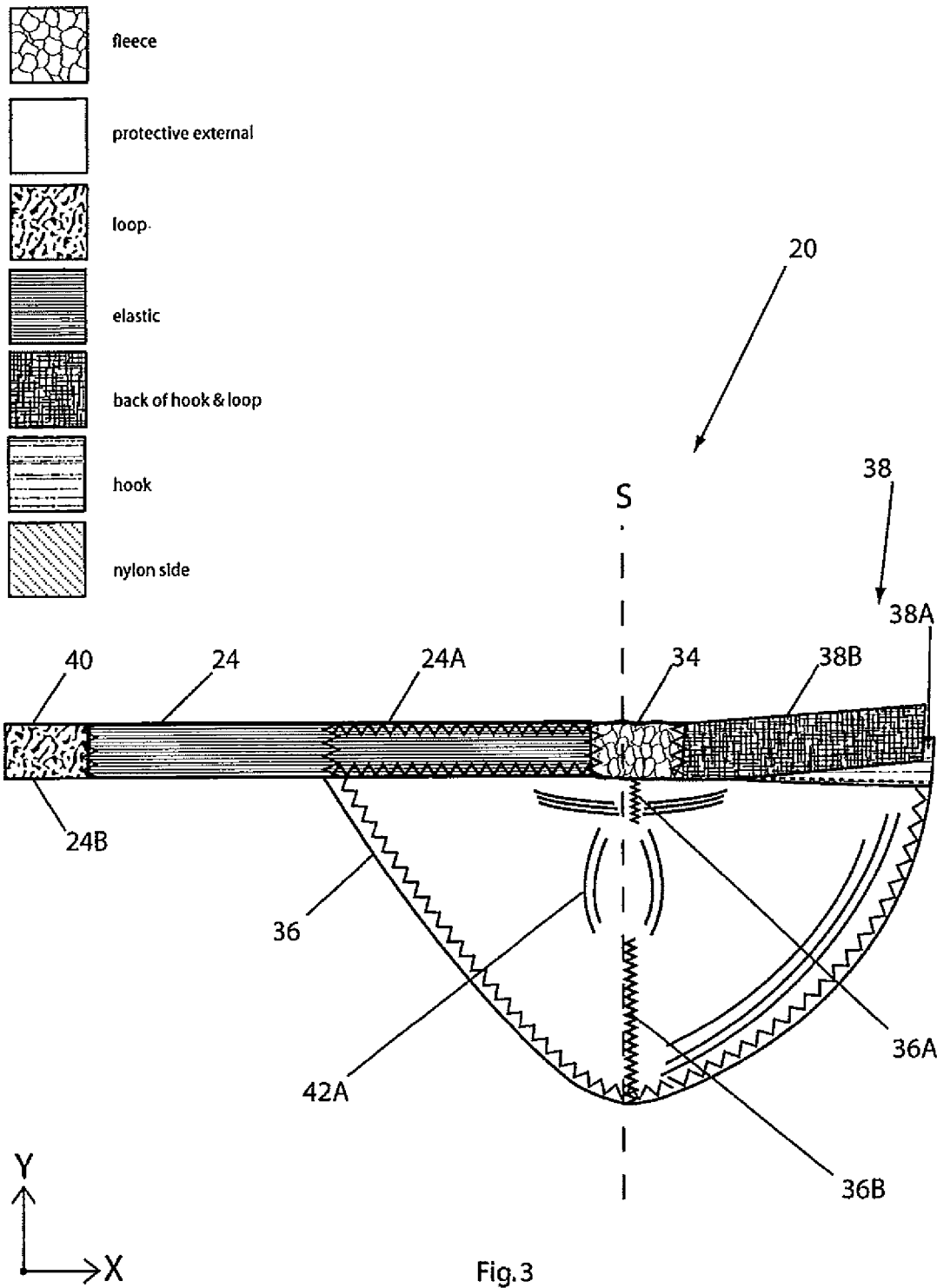
FIG. 3 is a view of an external side of the right hock protector of FIG. 2.

FIG. 3 is view of an external side of the right hock protector 38 and illustrates the right elastic band 24 sewn at a first right band end 24A with thread onto a right elastic fabric 36 of the right protective sheet 28. The right elastic external fabric 36 may comprise a neoprene sheet coupled with an external backing of KEVLAR™ para-amid sheet, CORDURA™ nylon sheet fabric marketed by INVISTA Corporation of Wichita, Kans. or other suitable durable, elastic material known in the art. For example, the right external fabric 36 may be or comprise a SUPRATEX™ abrasion resistant fabric marketed by Macro International Company of Irvine Calif., and having a thickness of 2 millimeters or greater. Alternatively or additionally, the right elastic external fabric 36 may be or comprise a nylon fabric, a neoprene sheet, a natural fiber, a synthetic fiber, an aromatic polyamide, a para-aramid fiber, synthetic rubber, an organic rubber, and/or other suitable material known in the art in singularity or in combination.

A length of hook fastener material 38 is folded and the bottom half 38A is sewn with thread onto to a right top area of the right protective sheet 28 and the top half B is left unstitched, and a loop fastener material 40 doubled over and then is sewn with thread onto two sides of a second right band end 24B of the right elastic band 24.

Referring now generally to the Figures and particularly to FIGS. 2, 4, 7A, and 7B, the hook fastener material 38A & 38B and the loop fastener material 40A & 40B in combination form the hook and loop fabric assembly 30.

The right hock protector 20 may be detachably attached to the horse right leg 16 by encircling the right horse leg 16 with a combination of the right elastic band 24 and the right protective sheet 28, and then coupling the doubled over loop fabric 40 of the second end 24B of the right elastic band 24 into the hook fabric material 38.

Various configurations of the right elastic external fabric 36 preferably extend along a height dimension parallel to the Y-axis to a length of less than one inch to more than nine inches, wherein the right elastic external fabric 36 is chosen having dimensions that are suitably sized and fitted to the horse 4.

The right hock protector 20 is shaped to form a right convex cup 42A that cups and partially encloses the back area of the right hock 21. A first right dart 36A and a second right dart 36B of the right elastic fabric 36 are sewn closed with thread to enable the formation of the right convex cup 42A.

The right elastic fabric 36 and the right elastic band 24 are selected to be elastic in order to expand as the horse 4 moves the right hock 21 through a normal range of motion wherein the hock bone 8 pushes toward the posterior direction from the horse 4 and away from the central axis H of the right hock 21, while maintaining attachment to the right horse leg 16. The right elastic fabric 36 and the right elastic band 24 are preferably selected, sized and shaped to in combination permit an expansion of up to three inches as the right hock passes through a normal range of motion while maintaining the right hock protector 20 substantially in position and covering at least half of the skin area of the back of the right hock 21.

The right hock protector 20 is asymmetric in shape as bisected both by the mutually parallel (a.) hock protector height dimension of the Y-axis and (b.) sagittal plane S of the right hock 21. This asymmetry extends through a width dimension of the right hock protector 20 that is both parallel to the X-axis and orthogonal to the height dimension of the Y-axis, wherein the right hock protector 20 presents less material toward the inside of the right leg 16, reduces the occurrence of the right hock protector 20 being rubbed against the left horse leg 14 and thereby being pushed away from a position of best protecting the right hock 21. It is understood that to substantially maintain a position by the right hock protector 20 may be defined herein to indicate that the right elastic band 24 maintains a position no more than four inches above the right hock 21, i.e., in a range of from zero to four inches proximal from the right hock 21 and along the horse right leg 16.

Figure 4:
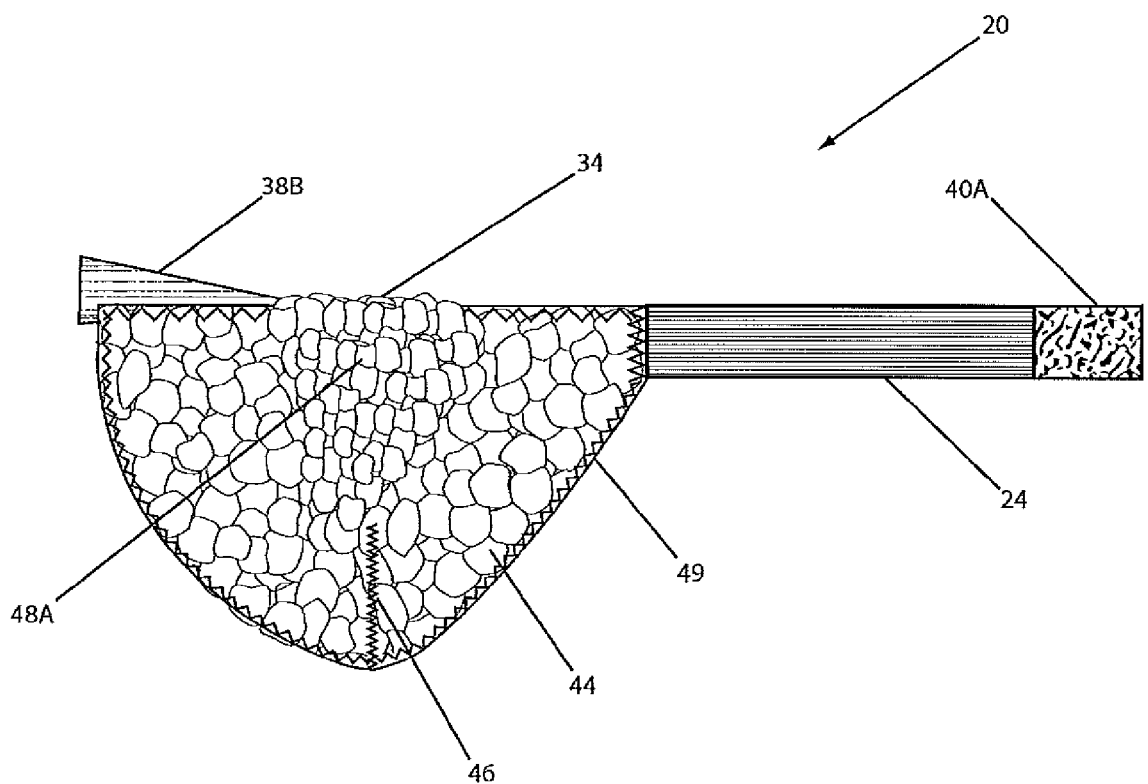
FIG. 4 is a view of an internal side of the right hock protector of FIG. 2 and FIG. 3.

FIG. 4 is a view of an internal side of the right hock protector 20. The right absorbent fabric tongue 34 (hereinafter "right tongue" 34) is comprised within a right absorbent fabric 44. A lower dart 46 of the right absorbent fabric 44 is sewn closed. A gathering of excess material 48A (hereinafter, "the right gathering" 48A) of the right absorbent fabric 44 is positioned at least partially within the right convex cup 42A. The right gathering 48A is preferably affected both within the right convex cup 42A and towards and including the right tongue 34.

Figure 5A:
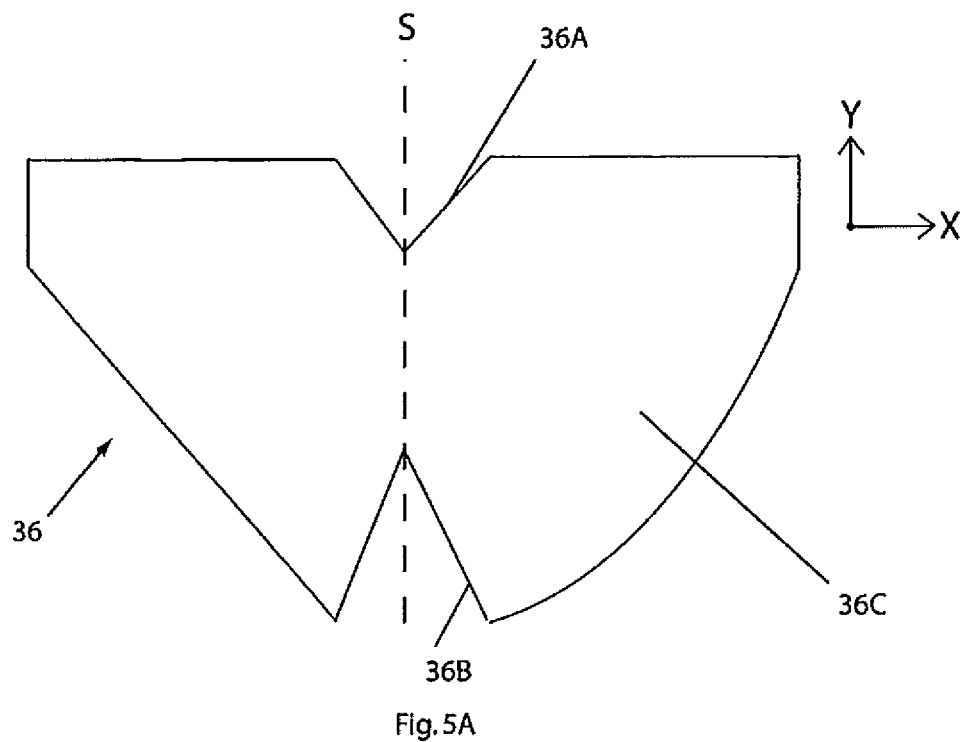
FIG. 5A is a view of an external side of the right elastic fabric of the right hock protector of FIG. 2, FIG. 3 and FIG. 4.

FIG. 5A is a view of an external side of the right elastic fabric 36 of the right hock protector 20 prior to attachment with the right absorbent fabric 44. The first right dart 36A and the second right dart 36B are not sewn together, and the right convex cup 42A is thus not formed. A sheet of a flexible, durable, abrasion resistant fabric 36C, such as a material comprising a Kevlar™ para-amid fabric, is presented as an external fabric 36C of the right elastic fabric 36. The asymmetric shape along the sagittal plane S of the right elastic fabric 36 is evident in FIG. 5A.

Figure 5B:
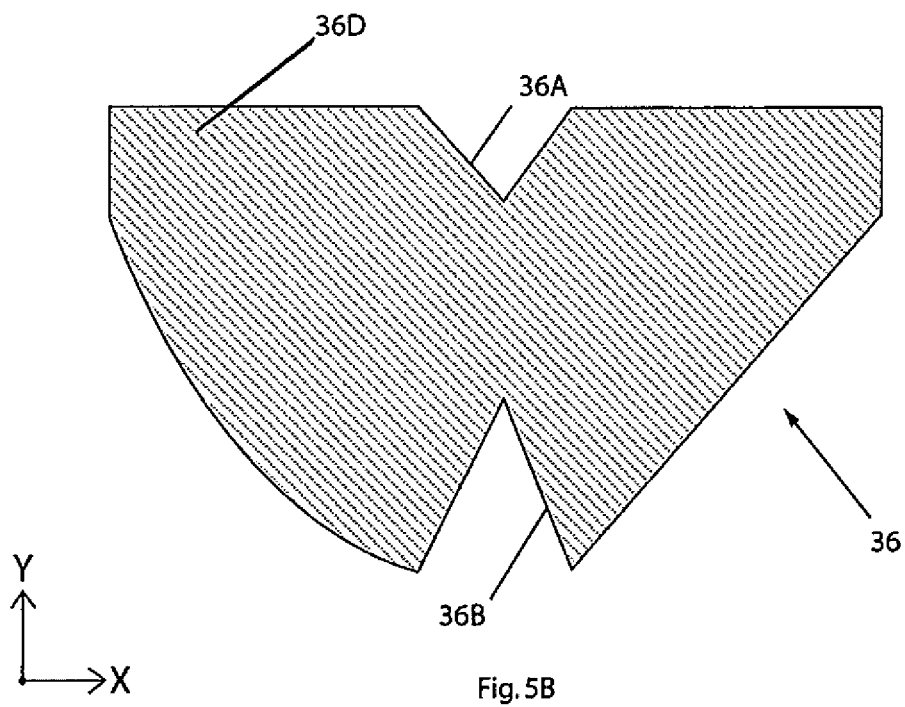
FIG. 5B is a view of an internal side of the right elastic fabric of the right hock protector of FIG. 2, FIG. 3, FIG. 4 and FIG. 5A.

FIG. 5B is a view of an internal side of the right elastic fabric 36 of the right hock protector 20 prior to attachment with the right absorbent fabric 44. The first dart right 36A and the right second dart 36B are not sewn together, and the right convex cup 42A is thus not formed. An internal flexible durable fabric 36D, such as a fabric comprising nylon or other suitable material, is presented as an internal element 36D of the right elastic fabric 36. The asymmetric shape along the sagittal plane of the right elastic fabric 36 is further evident in FIG. 5B.

Figure 6A:
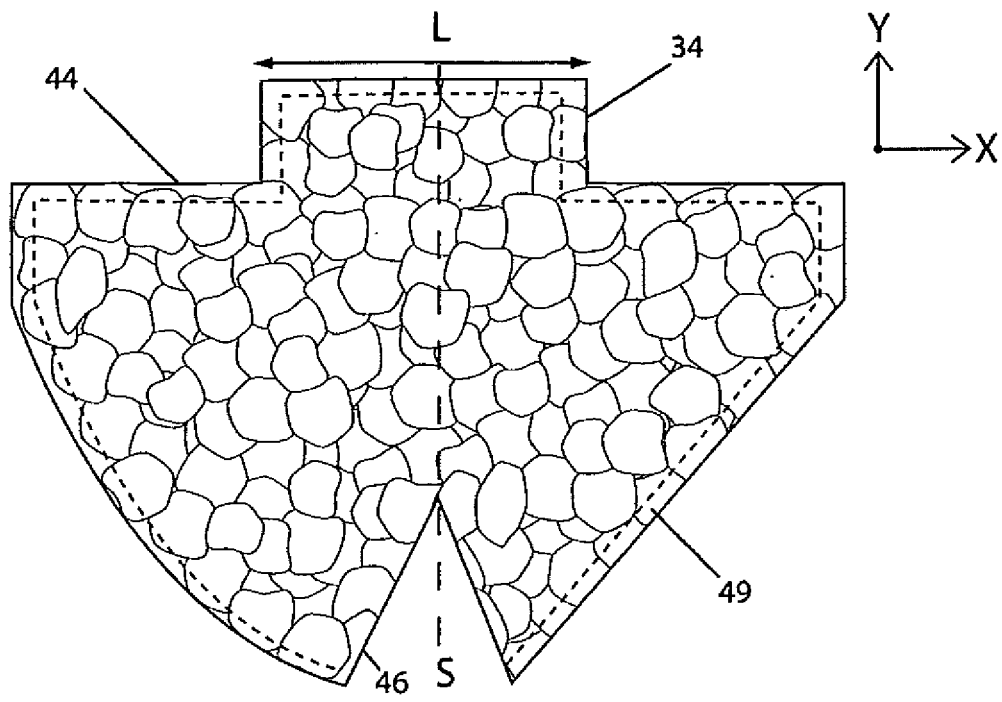
FIGS. 6A and 6B are views of an outer side of the right absorbent fabric of the right hock protector of FIG. 2, FIG. 3 and FIG. 4 prior to attachment with the right elastic fabric of FIG. 5A and FIG. 5B.

FIG. 6A is a view of an outer side of the right absorbent fabric 44 of the right hock protector 20 prior to attachment with the right elastic fabric 36. It is understood that the outer side of the right absorbent fabric is substantially presented against the right hock 21 when the right hock protector 20 is properly attached to the right horse leg 16.

The right absorbent fabric 44 may be or comprise a natural or synthetic fleece, and/or a wicking material that absorbs moisture and/or draws moisture away from the skin and hair of the horse 4. Alternatively or additionally, the right absorbent fabric 44 may be or comprise a natural absorbent fiber, a natural fleece, a synthetic absorbent fiber, a synthetic absorbent fleece, a natural wicking fiber, and/or a synthetic wicking fiber.

Figure 6B:
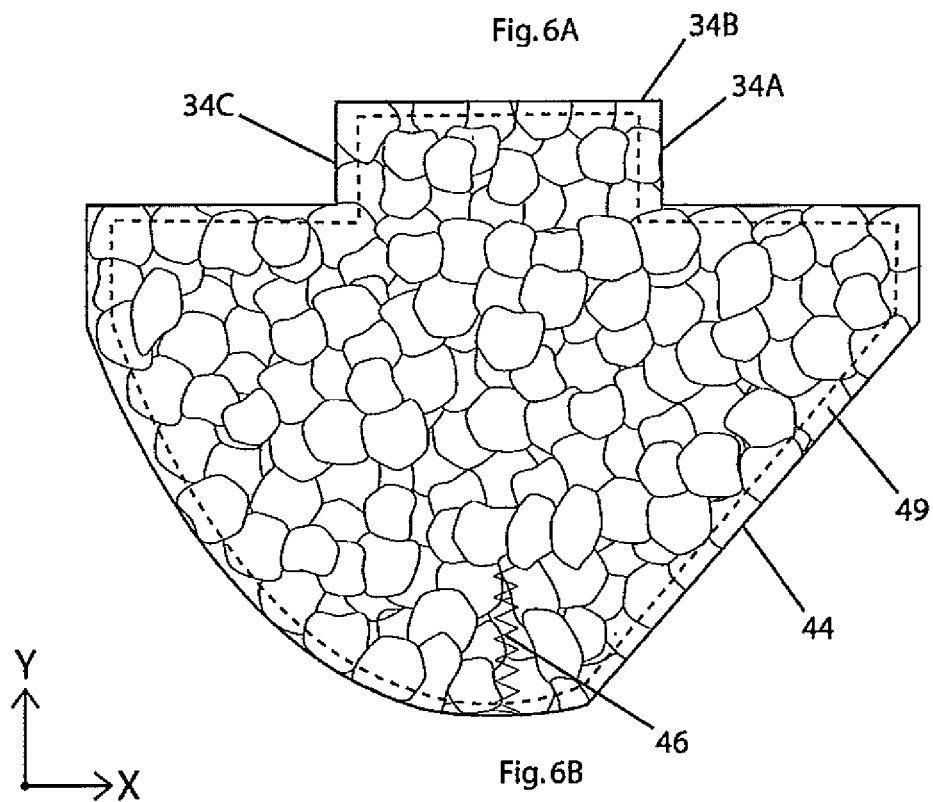

The right absorbent fabric 44 is shown to have the same asymmetry with respect to the sagittal plane as the right elastic fabric 36. The right absorbent fabric lower dart 46 is shown in an open position. In fabrication of the right hock protector 20, a right absorbent fabric periphery 49 is formed by sewing with thread with the right elastic fabric 36. Referring now to FIG. 6B, a set of three right tongue edges 34A, 34B and 34C of the right tongue 34 are comprised within the right absorbent fabric periphery 49 and are sewn onto the external side of the right elastic fabric 36 in order to form the right gathering 48A. The right absorbent fabric lower dart 46 is shown in FIG. 6B sewn with thread into a closed position.

Figure 7A:
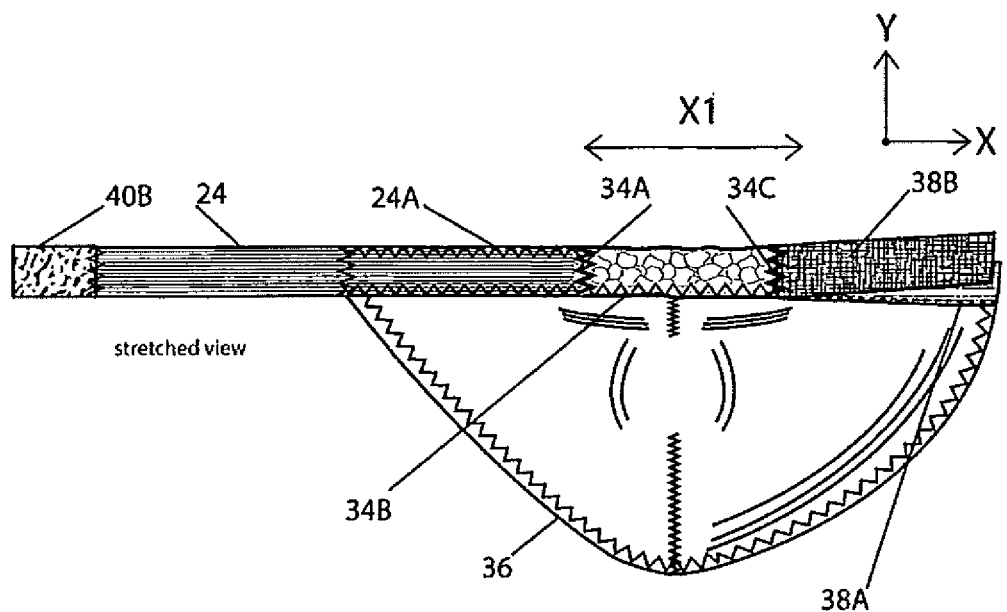
FIG. 7A illustrates the right hock protector of FIG. 2, FIG. 3 and FIG. 4 stretched along an X axis to present a stretched distance X1 between the first right band end and the hook fastener material.
Figure 7B:
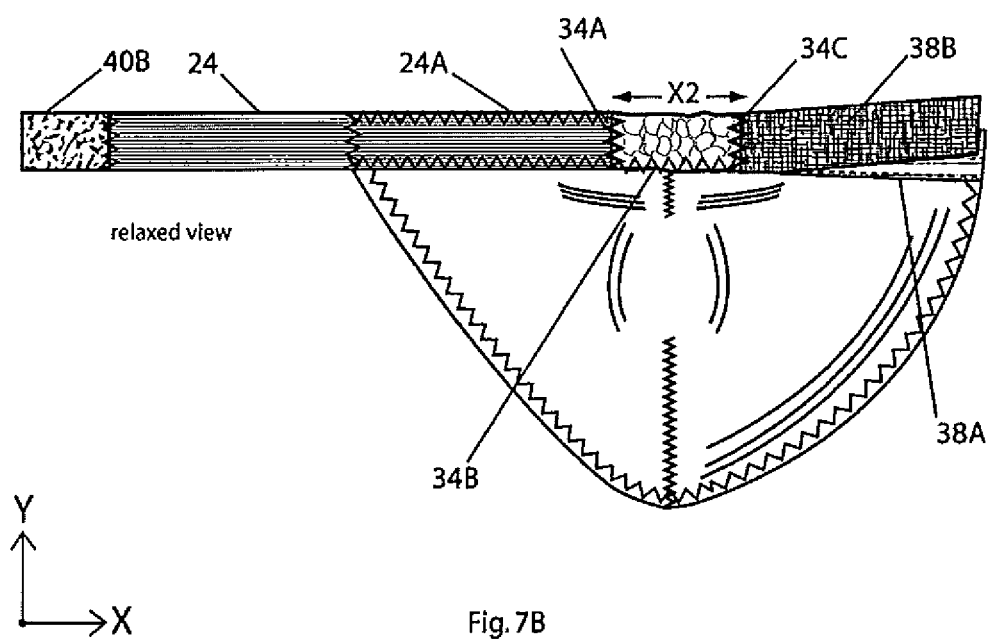
FIG. 7B illustrates the right hock protector of FIGS. 2 through 4 and 7A relaxed along an X axis an presenting a smaller distance X2 between the first right band end and the hook fastener material.

Referring now generally to the Figures and particularly to FIGS. 7A and 7B, FIGS. 7A and 7B are offered to explain a preferred method of attaching the right absorbent fabric 44 to the right elastic fabric 36 to form the right gathering 48A. It is understood that one of ordinary skill in the art, in light of the present disclosure, would be enabled to perform alternate and suitable known techniques known in the art to form the right gathering 48A of the right absorbent fabric 44.

FIG. 7A illustrates the right hock protector 20 stretched along the X-axis to present a stretched distance X1 between the first right band end 24A and the hook fastener material 38. FIG. 7B illustrates the right hock protector 20 in a relaxed state, and not under tension along the X axis, wherein the right elastic fabric 36 presents a smaller, relaxed distance X2 between the first right band end 24A and the hook fastener material 38. A fabricator may sew the right tongue edges 34A, 34B and 34C with thread onto the right elastic fabric 36 while the right hock protector 20 is stretched under tension to present the larger stretched distance X1. Referring now to FIGS. 6A and 7A, it is understood that the stretched distance X1 is preferably approximately equal to a flattened length L of the second right tongue edge 34B. It is further understood that the linear distance difference of magnitude between the relaxed distance X2 and the stretched distance X1 is preferably within the range of from 0.125 inches to three inches.

Figure 8:
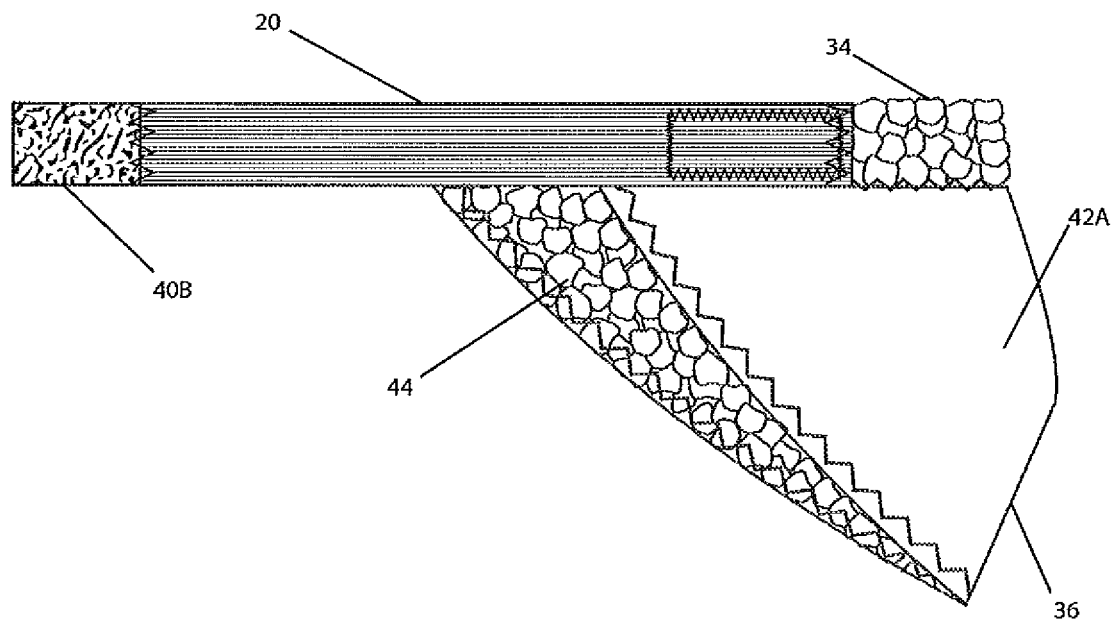
FIG. 8 is a perspective side view of the right hock protector of FIGS. 2 through 4, 7A and 7B, and illustrates the shape of a convex cup of the right hock protector.

FIG. 8 is a perspective side view of the right hock protector 20 showing the shape of the right convex cup 42A. The right absorbent fabric 44 is sewn onto the right elastic external fabric 36 to form the right protective sheet 28. The right protective sheet 28 is formed asymmetrically to reduce rubbing against the right protective sheet 28 by the horse left leg 14 that would cause the right hock protector 20 to be forced away from covering the second skin area of the right hock 21 of right leg 16 of the horse 4. The area of the right elastic external fabric 36 covered by the right absorbent fabric tongue 34, in combination with the right elastic band 24, enables the right hock protector 20 to expand under tension as the horse 4 walks, or moves, and the hock bone 8 pushes toward the posterior direction from the horse 4 and away from the central axis H of the right hock 21.

Figure 9:
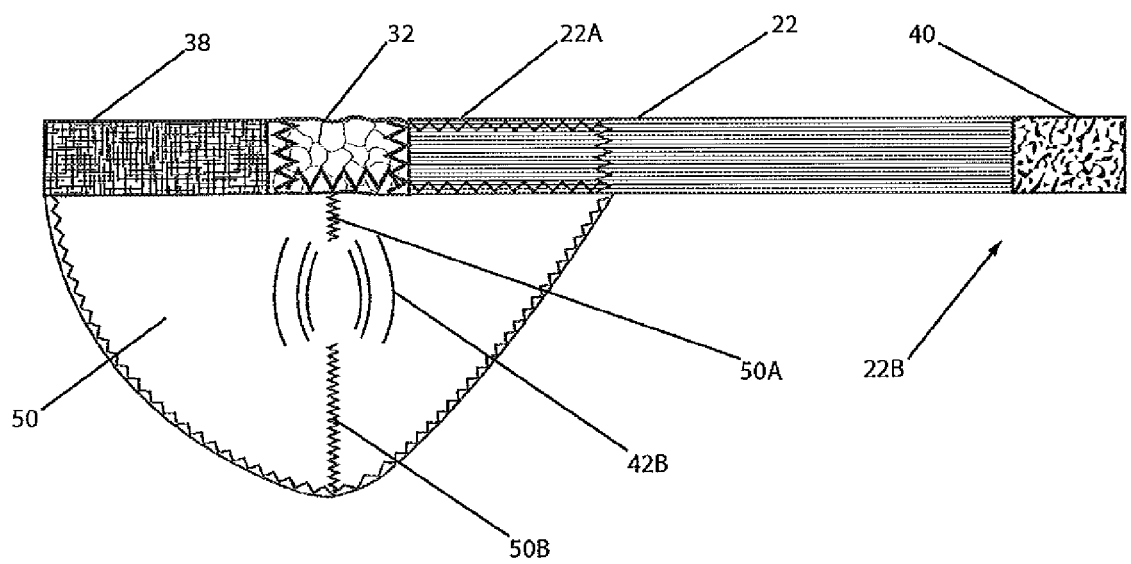
FIG. 9 is a view of an external side of the left hock protector of FIG. 2.

FIG. 9 is view of an external side of the left hock protector 18 of FIG. 2. The left elastic band 22 is sewn at a first left band end 22A with thread onto a left elastic fabric 50 of the left protective sheet 26. The left elastic external fabric 50 may comprise a neoprene sheet coupled with an external backing of KEVLAR™ para-amid sheet, CORDURA™ nylon sheet fabric marketed by INVISTA Corporation of Wichita, Kans. or other suitable durable, elastic material known in the art. For example, the left external fabric 50 may be or comprise a SUPRATEX™ abrasion resistant fabric marketed by Macro International Company of Irvine Calif., and having a thickness of 2 millimeters or greater. Alternatively or additionally, the left elastic external fabric 50 may be or comprise a nylon fabric, a neoprene sheet, a natural fiber, a synthetic fiber, an aromatic polyamide, a para-aramid fiber, synthetic rubber, an organic rubber, and/or other suitable material known in the art in singularity or in combination.

A hook fastener material 38 is sewn with thread onto to a left top area of the left protective sheet 18, and a loop fastener material 40 is sewn with thread onto two sides of a second left band end 22B of the left elastic band 22. The hook fastener material 38 and the loop fastener material 40 in combination form the hook and loop fabric assembly 30.

The left hock protector 18 may be detachably attached to the horse left leg 14 by encircling the left horse leg 14 with a combination of the left elastic band 22 and the left protective sheet 26, and then coupling the doubled over loop fabric 40 of the second end 22B of the left elastic band 22 into the hook fabric material 38.

Various configurations of the left elastic external fabric 50 preferably extend along a height dimension parallel to the Y-axis to a length of less than one inch to more than nine inches, wherein the left elastic external fabric 50 is chosen having dimensions that are suitably sized and fitted to the horse 4.

The left hock protector 18 is shaped to form a left convex cup 42B that cups and partially encloses the back area of the left hock 2. A first left dart 50A and a second left dart 50B of the left elastic fabric 50 are sewn closed with thread to enable the formation of the left convex cup 42B.

The left elastic fabric 50 and the left elastic band 22 are selected to be elastic in order to expand as the horse 4 moves the left hock 2 through a normal range of motion wherein the hock bone 8 pushes distally away from the central axis H of the left hock 2, while maintaining attachment to the left horse leg 14. The left elastic fabric 50 and the left elastic band 22 are preferably selected, sized and shaped to in combination permit an expansion of up to three inches as the left hock 2 passes through a normal range of motion while maintaining the left hock protector 18 substantially in position and covering at least half of the skin area of the back of the left hock 2.

The left hock protector 18 is asymmetric in shape as bisected by the sagittal plane S of the left hock 2. This asymmetry along the X axis, wherein the left hock protector 18 presents less material toward the inside of the left leg 14, reduces the occurrence of the left hock protector 18 being rubbed against the right horse leg 16 and thereby being pushed away from a position of best protecting the left hock 2. It is understood that to substantially maintain a position by the left hock protector 18 may be defined as where the left elastic band 22 maintains a position no more than four inches above the left hock 2, i.e., in a range of zero to four inches proximal from the left hock 2 along the horse left leg 14.

Figure 10:
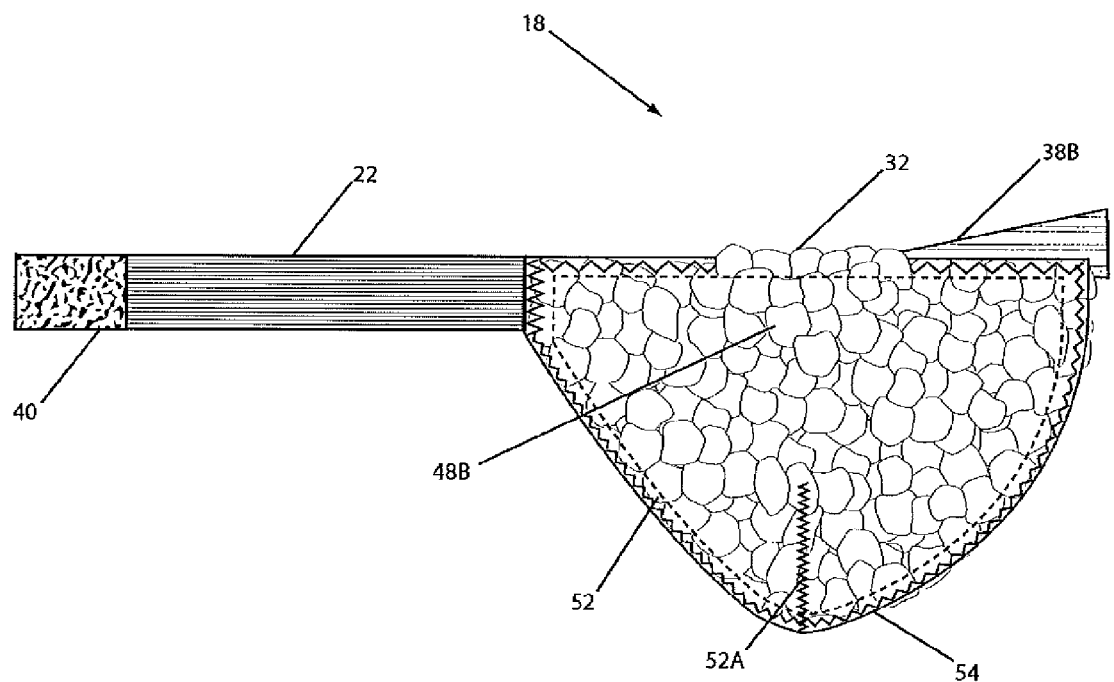
FIG. 10 is a view of an internal side of the left hock protector of FIG. 2 and FIG. 9.

FIG. 10 is a view of an internal side of the left hock protector 18. The left absorbent fabric tongue 32 (hereinafter "left tongue" 32) is comprised within a left absorbent fabric 52. A left lower dart 52A of the left absorbent fabric 52 is sewn closed. A second gathering of excess material 48B of the left absorbent fabric 52 is positioned at least partially within the left convex cup 42B. The second gathering of excess material 48B (hereinafter, "the left gathering" 48B) of the left absorbent fabric 52 is preferably affected both within the left convex cup 42B and towards and including the left tongue 32.

Figure 11A:
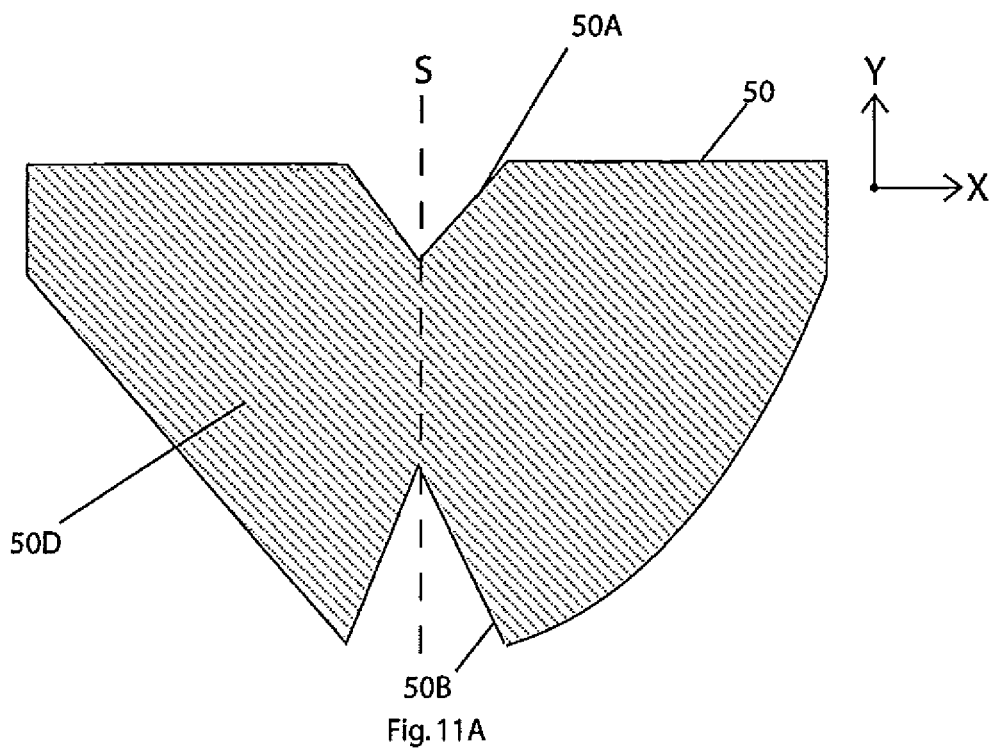
FIG. 11A is a view of an internal side of the left elastic fabric of the left hock protector of FIG. 2, FIG. 9 and FIG. 10.

FIG. 11A is a view of an internal side of the left elastic fabric 50 of the left hock protector 18 prior to attachment with the left absorbent fabric 52. A first left dart 50A and a second left dart 50B are not sewn together, and the left convex cup 42B is thus not formed. An internal flexible durable fabric 50D, such as a fabric comprising nylon or other suitable material, is presented as an internal element 50D of the left elastic fabric 50 The asymmetric shape along the left hock sagittal plane S of the left elastic fabric 50 is further evident in FIG. 11A.

Figure 11B:
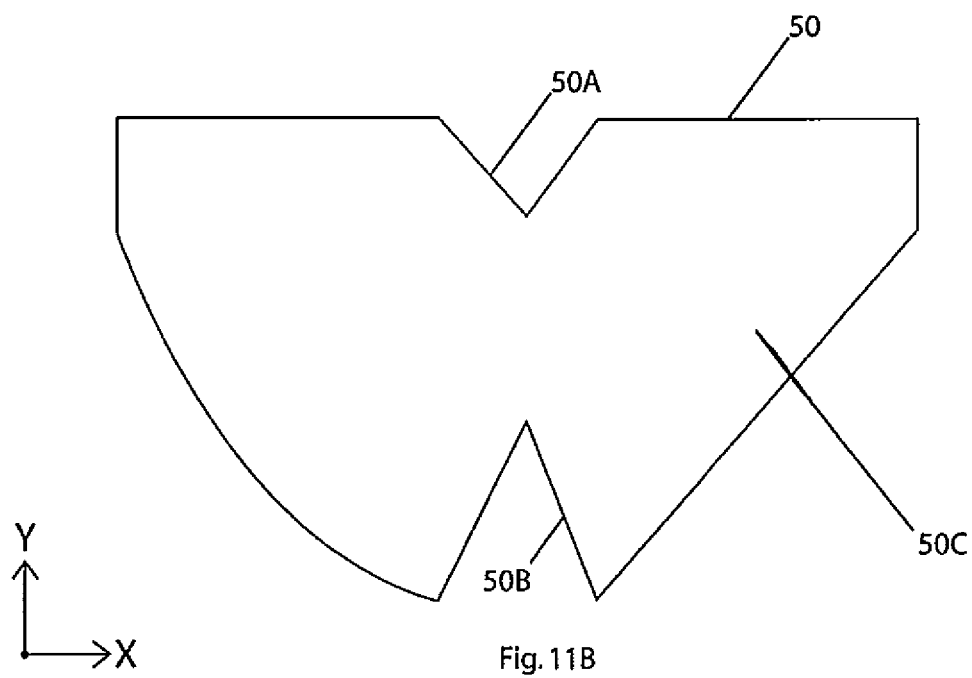
FIG. 11B is a view of an external side of the right elastic fabric of the right hock protector of FIG. 2, FIG. 9, FIG. 10 and FIG. 11A.

FIG. 11B is a view of an external side of the left elastic fabric 50 of the left hock protector 18 prior to attachment with the left absorbent fabric 52. The first left dart 50A and the second left dart 50B are not sewn together, and the left convex cup 42B is thus not formed. An abrasion-resistant fabric 50C, such as a material comprising a Kevlar™ para-amid fabric, is presented as an external element 50C of the left elastic fabric 50. The asymmetric shape along the sagittal plane S of the left elastic fabric 50 is evident in FIG. 11B.

Figure 12A:
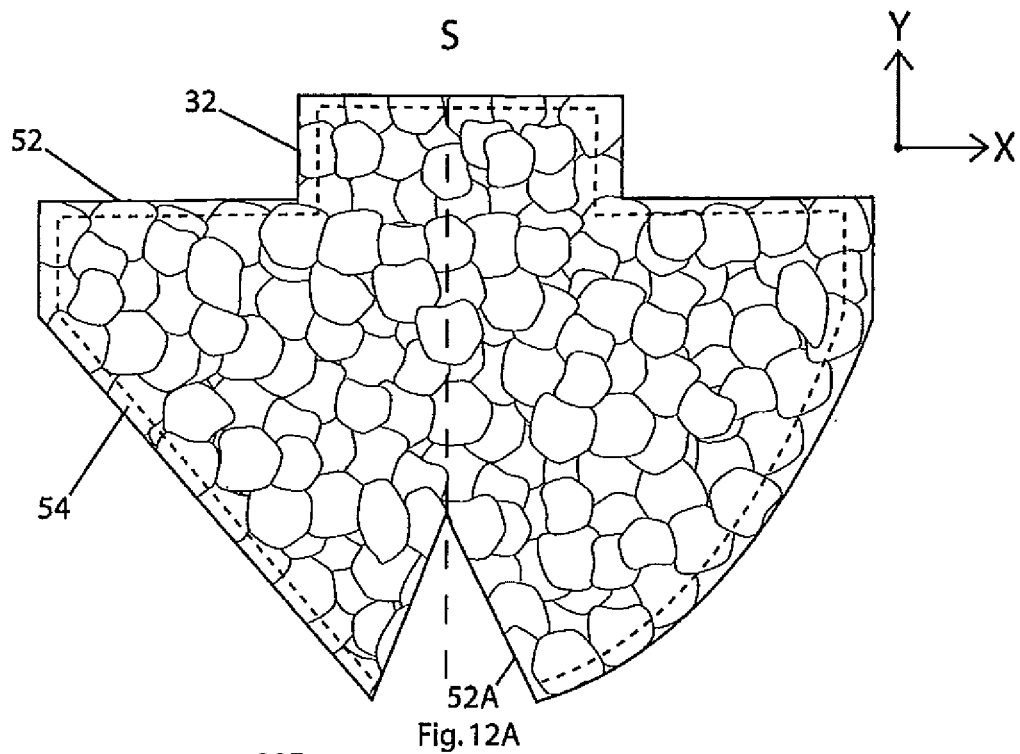
FIGS. 12A and 12B are views of an outer side of the left absorbent fabric of the left hock protector of FIG. 2, FIG. 9 and FIG. 10 prior to attachment with the left elastic fabric of FIG. 11A and FIG. 11B.

FIG. 12A is a view of an outer side of the left absorbent fabric 52 of the left hock protector 18 prior to attachment with the left elastic fabric 50. It is understood that the outer side of the left absorbent fabric 52 is substantially presented against the left hock 2 when the left hock protector 18 is properly attached to the left horse leg 14.

The left absorbent fabric 52 may be or comprise a natural or synthetic fleece, and/or a wicking material that draws moisture away from the skin and hair of the horse 4. Alternatively or additionally, the left absorbent fabric 52 may be or comprise a natural absorbent fiber, a natural fleece, a synthetic absorbent fiber, a synthetic absorbent fleece, a natural wicking fiber, and/or a synthetic wicking fiber.

Figure 12B:
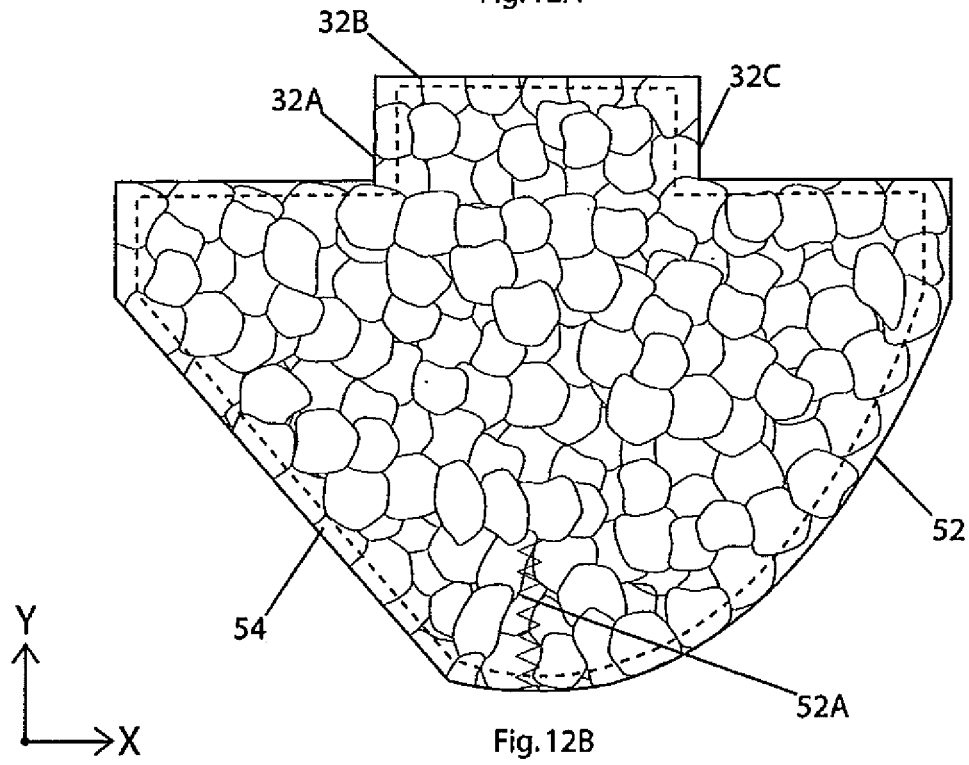

The left absorbent fabric 52 is shown to have the same asymmetry with respect to the sagittal plane S of the left hock 2 as the left elastic fabric 50. The left absorbent fabric lower dart 52A is shown in an open position. In fabrication of the left hock protector 18, a left absorbent fabric periphery 54 is formed by sewing of thread with the left elastic fabric 50. Referring now to FIG. 12B, a plurality of three left tongue edges 32A, 32B and 32C of the left tongue 32 are comprised within the left absorbent fabric periphery 54 and are sewn onto the external side of the left elastic fabric 50 in order to form the left gathering 48B. The left absorbent fabric lower dart 52A is shown in FIG. 12B as sewn with thread into a closed position.

Figure 13:
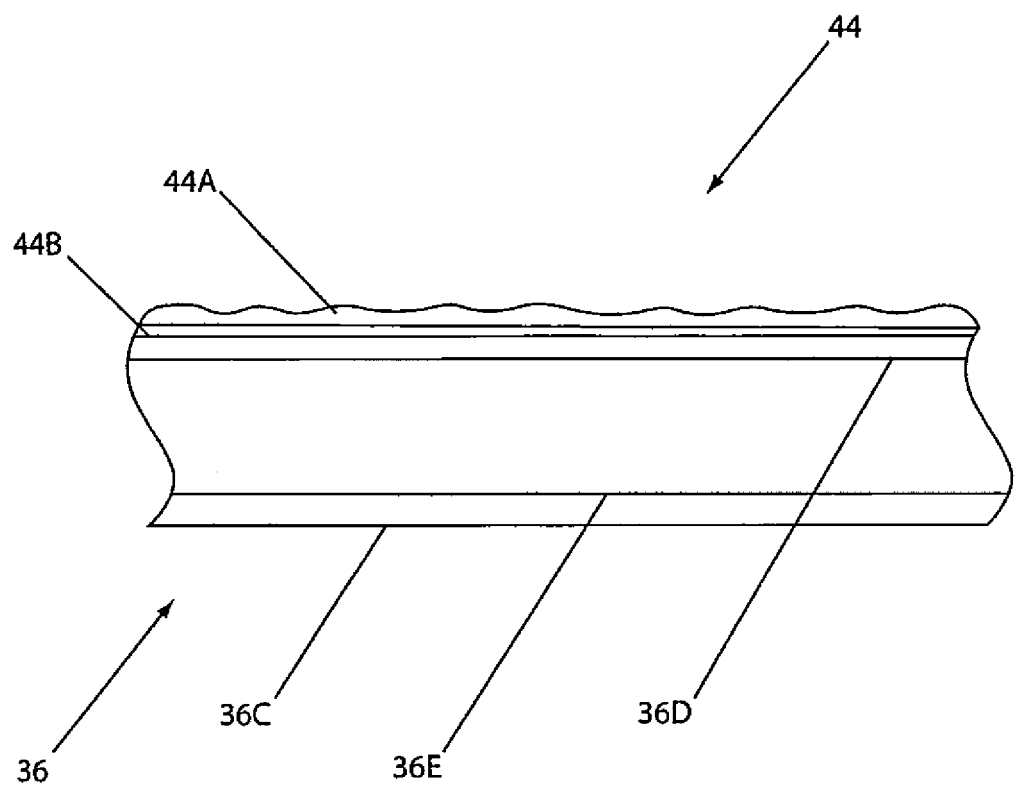
FIG. 13 is a cut-away side view of the right elastic fabric of the right hock protector of FIGS. 2 through 5B.

FIG. 13 is a cut-away side view of the right protective sheet 28 and comprising the cut-away views of the right elastic fabric 36 and the right absorbent fabric 44. A cushioning layer 36E of neoprene, or other suitable durable cushioning material known in the art, is disposed between the external abrasion-resistant fabric 36C and the internal flexible durable fabric 36D. The right absorbent fabric 44 is shown to include an absorbent and/or wicking material 44A that is interwoven with, adhered to, or coupled with a backing 44B. The absorbent and/or wicking material 44A may be or comprise a natural or synthetic fleece, and/or a wicking material that draws moisture away from the skin and hair of the horse 4. The backing 44B may be a cotton fabric, or other suitable natural of synthetic material known in the art.

Figure 14:
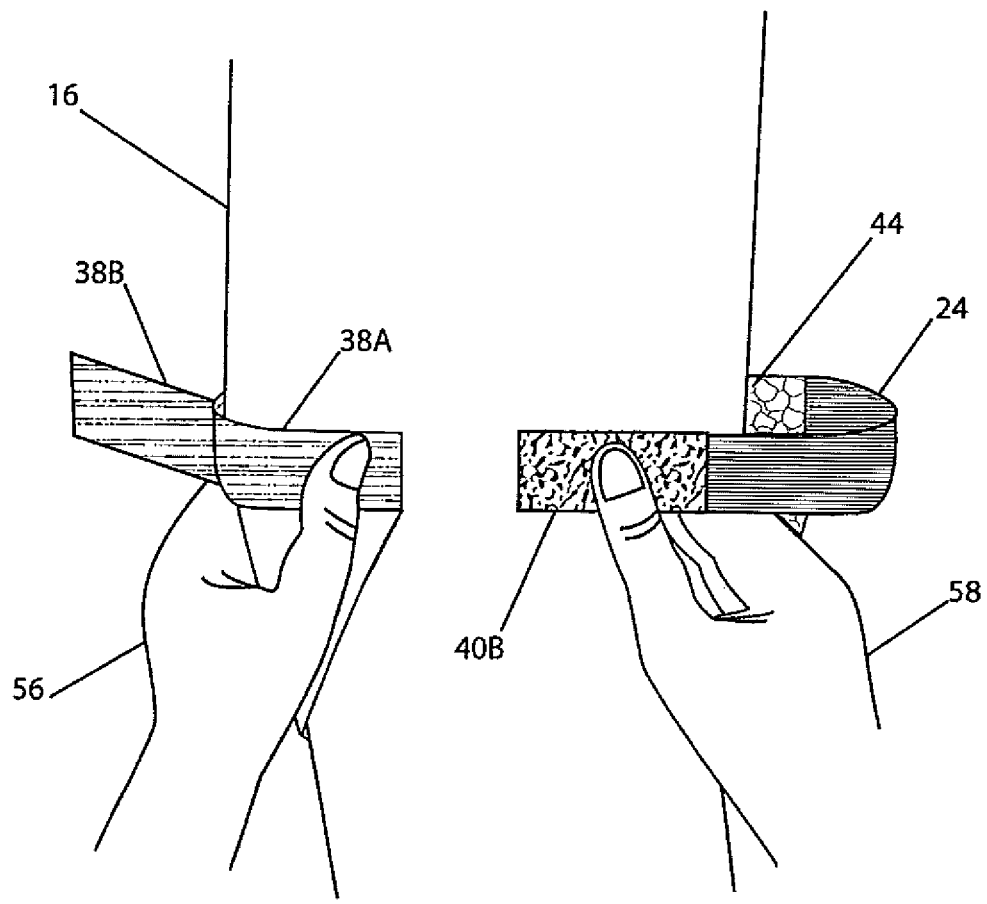
FIG. 14 is a perspective view of the right hock protector of FIG. 2 in an instant of an attachment process.

Referring now generally to the Figures and particularly to FIG. 14, FIG. 14 is a perspective view of the right hock protector 20 in an attachment process. The right protective sheet 28 and the right elastic band 24, in combination, will encircle the right rear leg 16 of the horse 4 when the loop fabric material 40 of the right elastic band 24 is coupled with the right hook fabric material 38. Each of a pair of hook fabric strips 38A and 38B of the right hook fabric material 38 detachably couples with a separate side 40A and 40B of the right loop fabric 40 of the elastic band. A human applier may open up the right hook fabric material 38 with a left hand 56 while pulling the loop fabric material 40 with a right hand 58 toward the hook fabric assembly 38. The hook fabric material 38 and the loop fabric material 40 form one instance of the hook and loop attachment assembly 30.

It is understood that in various alternate configurations of the present invention the loop fabric material 40 may be attached with a protective sheet 26 and 28 and a hook fabric material 38 may be attached to a second end of an elastic band 22 and 24 to in combination form an alternate hook and loop fastener assembly 30.

It is further understood that one of ordinary skill in the art, in light of the present disclosure, would be enabled to apply alternate and suitable known devices and techniques known in the art to detachably attach the elastic bands 22 and 24 to a separate and individual protective sheet 26 and 28. For example, the right elastic band 24 or left elastic 22 may be optionally detachably attachable to their attached protective sheet 26 and 28 by means of a zipper assembly, a button and buttonhole combination, or other suitable detachable attachment means known in the art.

Figure 15:
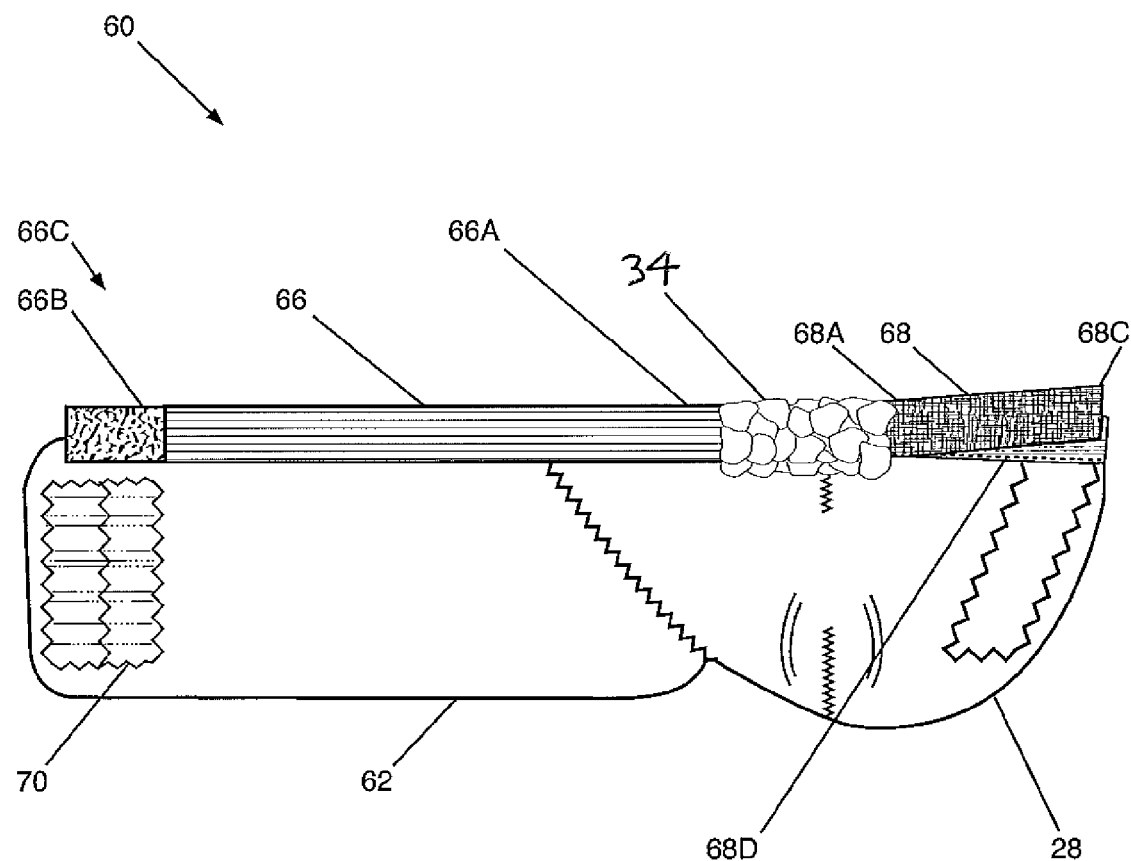
FIG. 15 is a view of an external side of a second right hock protector in a first position having an elastic extension and a detachable attachment assembly.
Figure 17:
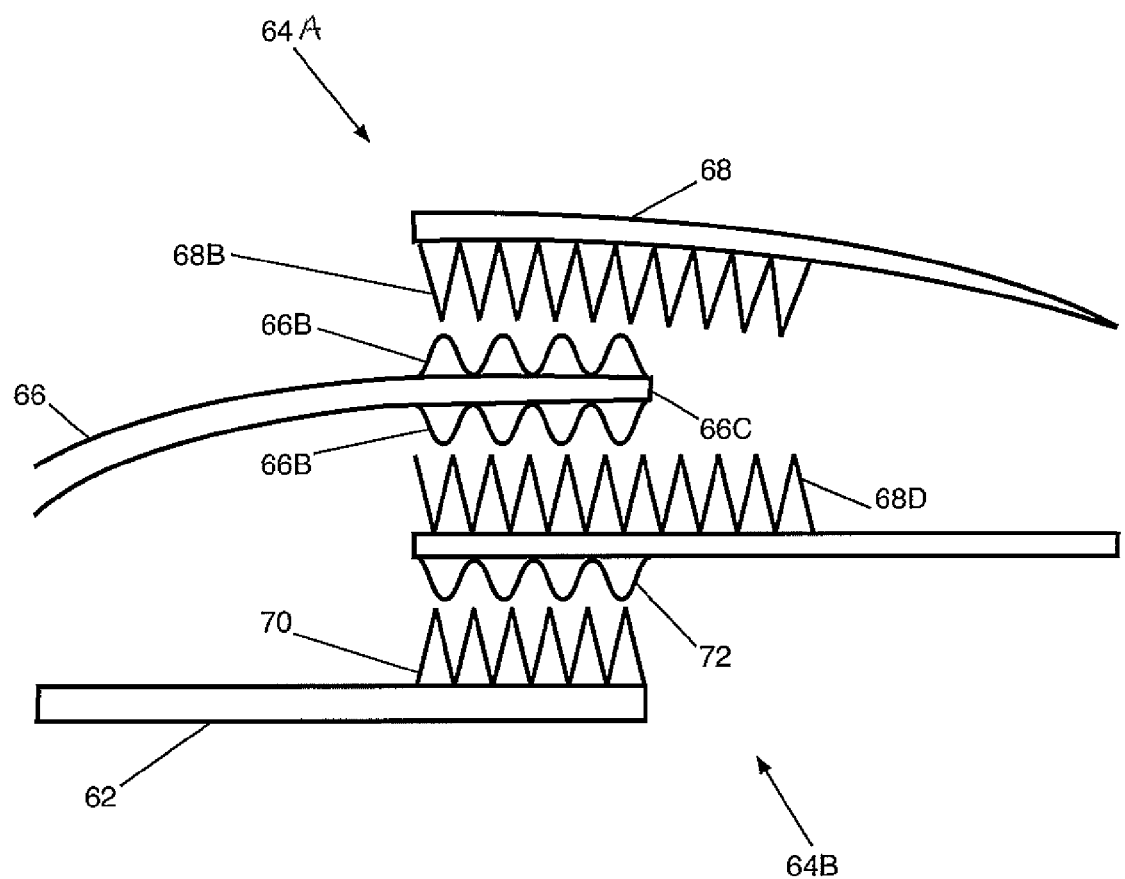
FIG. 17 is a top exploded detail view of the detachable attachment assembly of FIGS. 15 and 16.

FIG. 15 is a view of an external side of a second right hock protector 60 in a first position. The second right hock protector 60 includes the right protective sheet 28, an elastic extension 62 and a detachable attachment assembly 64A & 64B (of FIGS. 17 and 18). The detachable assembly 64A & 64B includes an attachment ribbon 66 and a flap 68. The attachment ribbon 66 is permanently attached to the protective sheet 28 at a first ribbon end 66A and presents a first loop attachment strip 66B on both sides of a second ribbon end 66C. The flap 68 is permanently attached to the right protective sheet 28 at a first flap end 68A. As shown in FIG. 17, the flap 68 includes a first complementary hook strip 68B at a second flap end 68C. A second complementary hook strip 68D is affixed to the exterior of the right protective sheet 28. A third hook strip 70 is attached to the elastic external fabric 36 of the elastic extension 62.

The elastic extension preferably extends in length along the X-axis for a length within the range of three inches to two feet, and in a height dimension along the Y-axis in the range from one fourth of the height dimension of the right protective sheet 28 to a height approximately fully equal in dimension to the height dimension of the right protective sheet 28.

The elastic extension 62 may be or comprise a neoprene sheet, a neoprene sheet coupled with an external backing of Kevlar™ para-amid sheet or other suitable durable, elastic material known in the art. For example, the right external fabric 36 may be or comprise a SUPRATEX™ abrasion resistant fabric marketed by Macro International Company of Irvine Calif., and having a thickness of 2 millimeters or greater. Alternatively or additionally, the elastic extension 62 may be or comprise a nylon fabric, a neoprene sheet, a natural fiber, a synthetic fiber, an aromatic polyamide, a para-aramid fiber, synthetic rubber, an organic rubber, and/or other suitable material known in the art in singularity or in combination.

The absorbent fabric 44 may be attached to the elastic extension 60 by sewing, adhesion or other suitable means and methods known in the art. The ribbon 66 may be attached to the protective sheet 28 by sewing, adhesion or other suitable means and methods known in the art. The first hook and loop attachment strip 66B may be attached to the ribbon 66 by sewing, adhesion or other suitable means and methods known in the art. The third hook strip 70 may be attached to the elastic extension 62 by sewing, adhesion or other suitable means and methods known in the art.

The flap 68 may be attached to the right protective sheet 28 by sewing, adhesion or other suitable means and methods known in the art.

Figure 16:
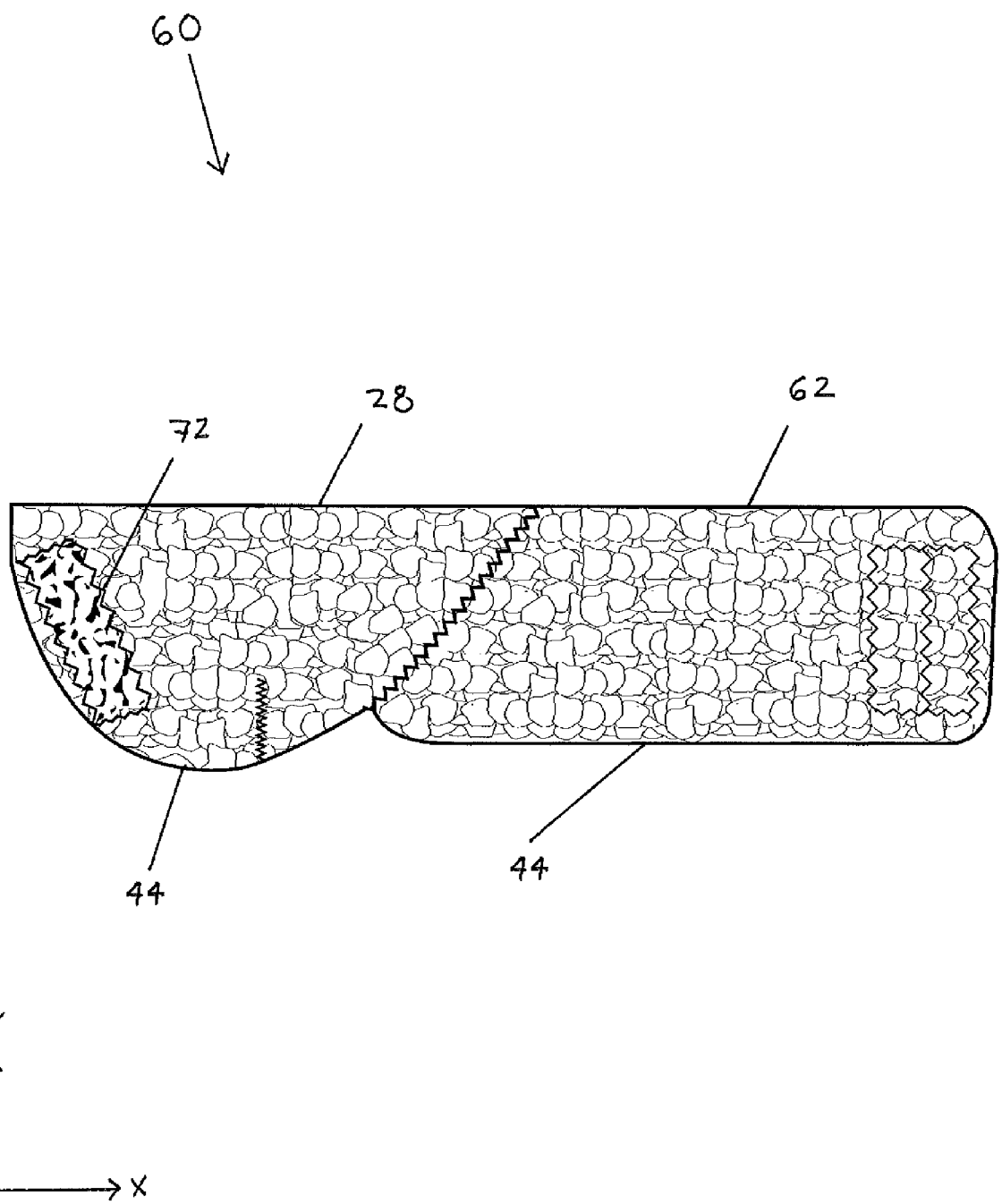
FIG. 16 is a view of an internal side of the second right hock protector of FIG. 15 in the first position.

FIG. 16 is a view of an internal side of the second right hock protector 60 in the first position. The right absorbent fabric 44 is sewn onto the right elastic external fabric 36 of both the right protective sheet 28 and the elastic extension 62. A second complementary loop strip 72 is attached to the interior side of the right protective sheet 28. The second complementary loop strip 72 may be attached to the right protective sheet 28 by sewing, adhesion or other suitable means and methods known in the art FIG. 17 is a top exploded detail view of the detachable attachment assembly of 64A & 64B. The first loop attachment strip 66B of the attachment ribbon 66, first complementary hook strip 68B of the flap 68, and the second complementary hook strip 68D in combination form a first detachable attachment assembly 64A. The third hook strip 70 in combination with the second complementary loop strip 72 form a second detachable attachment assembly 64B.

Figure 18:
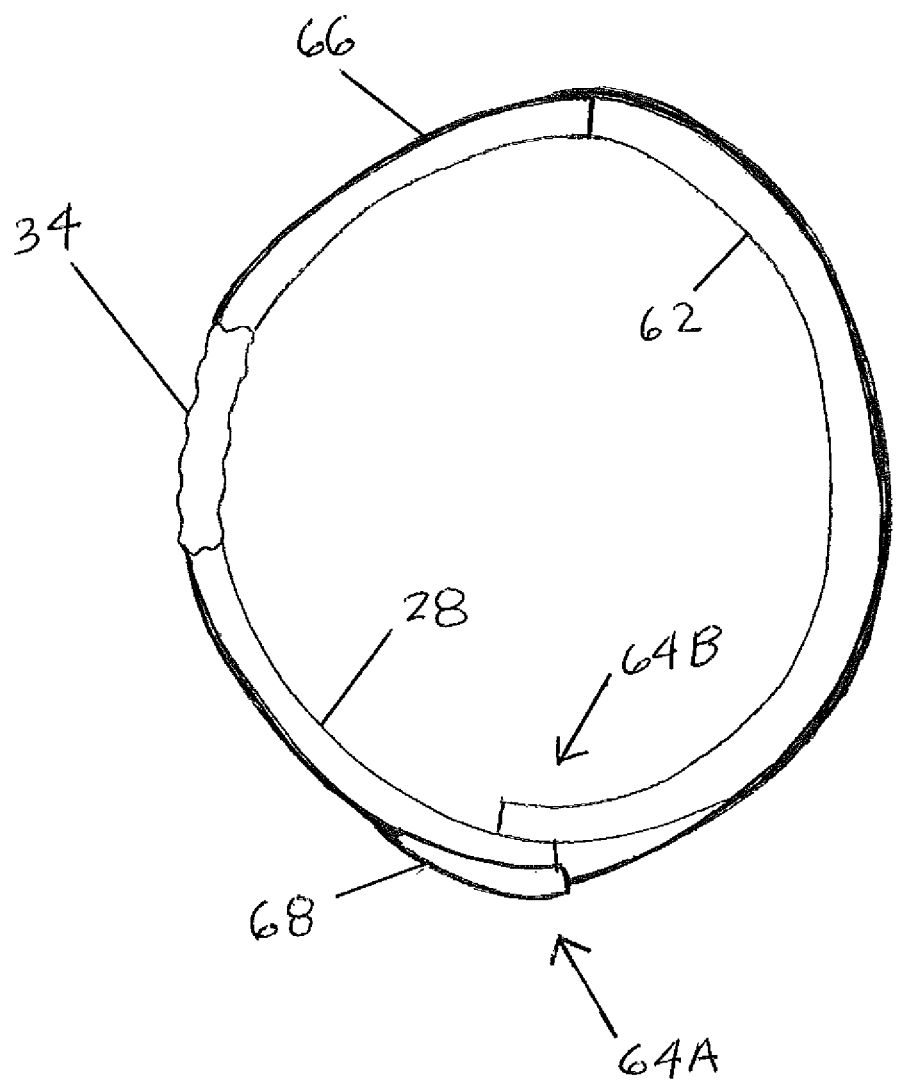
FIG. 18 is a top view of the second right hock protector of FIGS. 15, 16 and 17 in a second position.

FIG. 18 is a top view of the second right hock protector of FIGS. 15, 16 and 17 in a second position, wherein (a.) the attachment ribbon 66 is simultaneously and detachably engaged with the both first complementary hook strip 68B the second complementary hook strip 68D to in a second position of the first detachable attachment assembly 64A; and (b) the third hook strip 70 is engaged with the second complementary loop strip 72 form the second detachable attachment assembly 64B.

It is understood that the second hock protector 60 may be adapted for use on the left leg by shaping a second right hock protector (not shown) as a mirror image of the second hock protector 60. It is further understood that the strips 66B, 68B, 68D 70 & 72 may be or comprise VELCRO™ hook fabric or VELCRO™ loop fabric in suitable complementary placements known in the art that are adapted to enable the engagement of the strips 66B, 68B, 68D 70 & 72 to position the first detachable attachment assembly 64A and the second detachable attachment assembly 64B in the attachment positions of FIG. 18 wherein the right protective sheet 28 and the elastic extension 62 are detachably attached while encircling the horse right leg 14.

Figure 19:
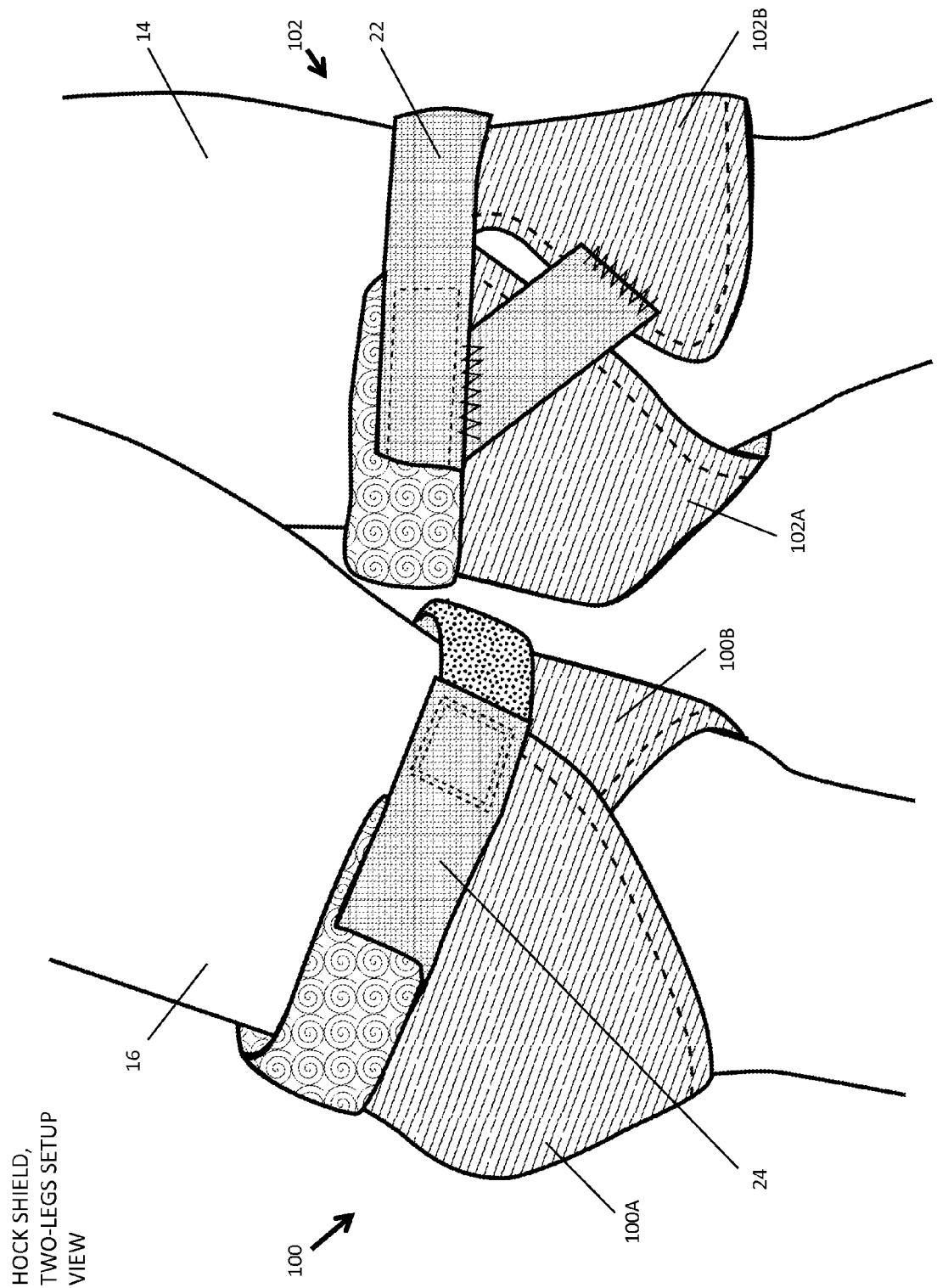
FIG. 19 is a perspective view of an alternate, dual sheet, preferred embodiment of the present invention, wherein a pair of dual sheet hock protectors are shown as being worn by the horse.
Figure 20:
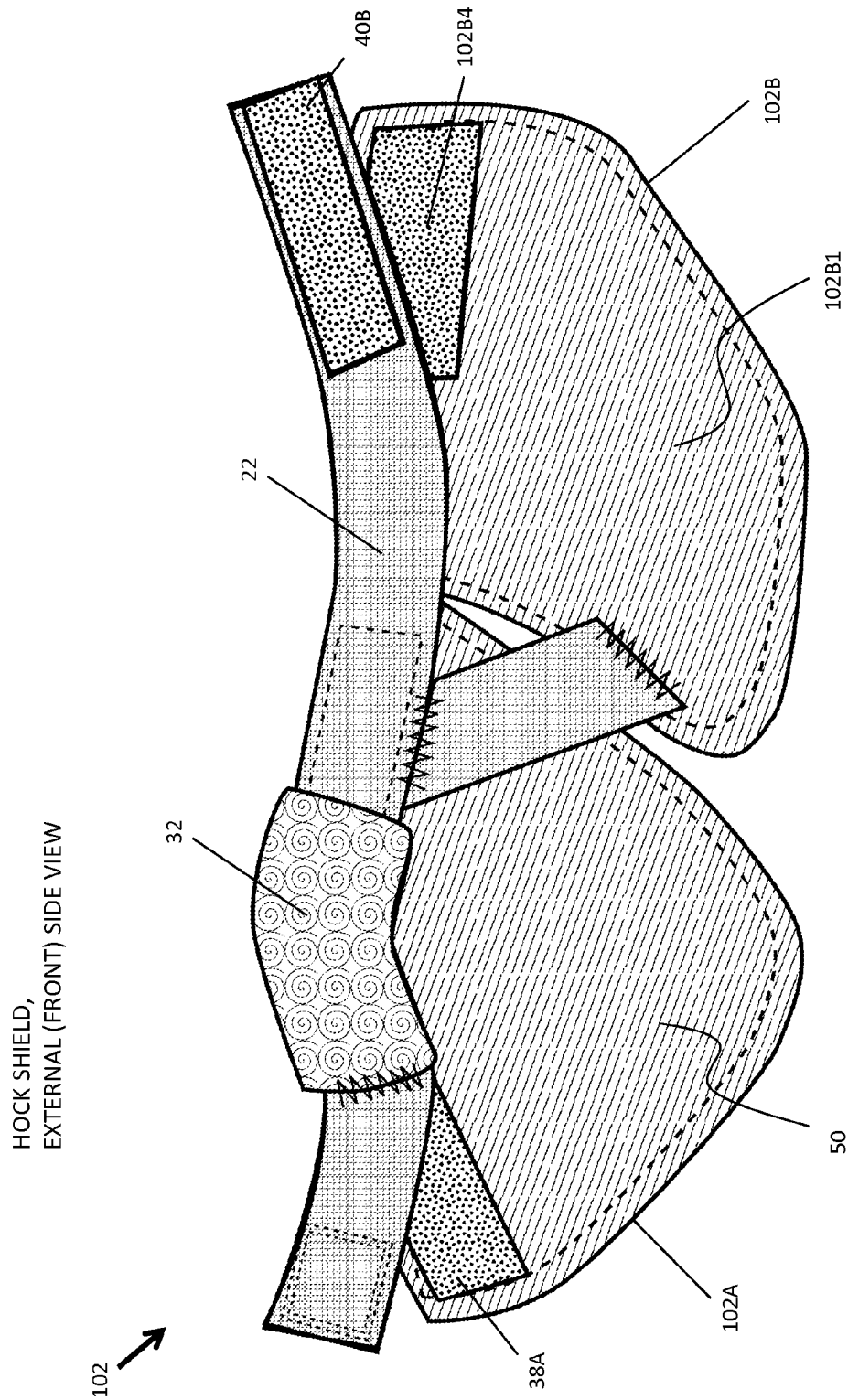
FIG. 20 is a front view of an external side view of the single dual sheet hock protector of FIG. 19 with exposed coupling elements.

FIG. 19 is a perspective view of an alternate, dual sheet, preferred embodiment of the present invention, wherein a pair of dual sheet hock protectors 100 & 102 are shown as being respectively worn about each horse leg 14 & 16 the horse. The first single dual sheet hock protector 100, or right dual sheet hock protector 100, is shaped to conform for coupling with the horse's right leg 16 and the second single dual sheet hock protector 102, or left hock dual sheet protector 102 is shaped to conform for coupling with the horse's left leg 14.

Each dual sheet hock protector 100 & 102 includes a hock protective sheet 100A & 102A and a left front protective sheet 100B & 102B. The respective single elastic bands 22 & 24 of the right hock protector 100 and the left hock protector 102 are shaped and sized to be placed above a respective right hock or left hock and to couple the respective comprising hock protector 100A & 102A to a horse's leg 14 & 16 without additional restraint.

Figure 21:
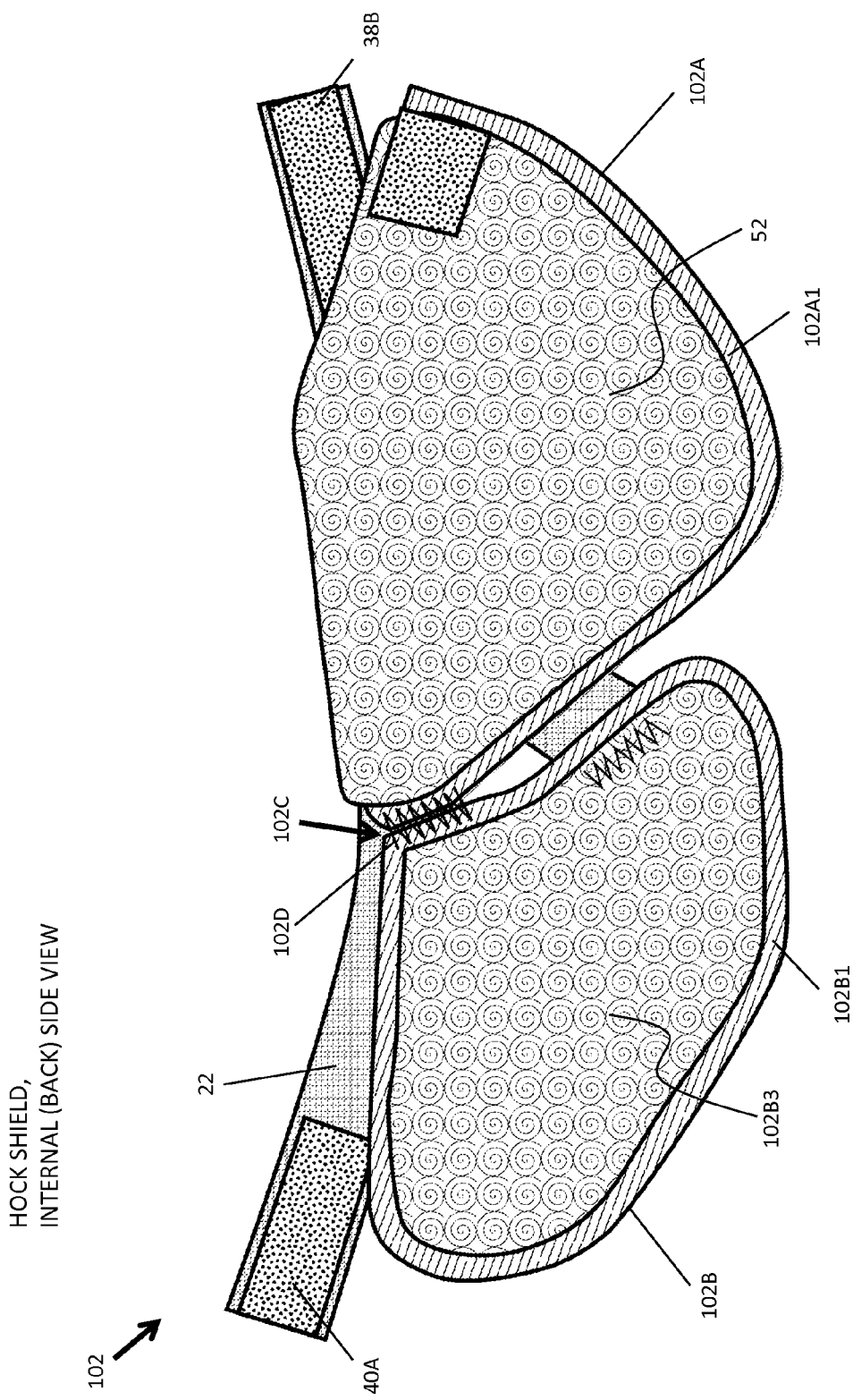
FIG. 21 is a front view of an internal side of the single dual sheet hock protector of FIG. 19 with exposed coupling elements.

FIG. 21 is an alternate front view of the external side of the left hock protector 102 wherein the hook and loop fabric coupling elements 38A, 40 and 102B4 are exposed. The left hock protective sheet 102A and the left front protective sheet 102B are coupled by a sheet stitching 102C of the thread 102D. The sheet stitching 102C is preferably approximately no longer than the Y-dimension width of the left elastic band 22 to insure that the left hock protective sheet 102A and the left front protective sheet 102B may have flexibility in dynamically conforming to the horse's left leg during movement of the horse's left leg 14 in locomotion.

The left elastic band 22 is coupled by sewing with thread at the first left band end 22A with the left hock protective sheet 102A. The hook fastener material 38 and the loop fastener material 40 in combination form the hook and loop fabric assembly 30. The hook fastener material 38A is sewn with thread onto to a left top area of the left hock protective sheet 102A. The loop fastener material 40 is doubled over and is sewn with thread onto two sides of the second left band end 22B of the left elastic band 22.

The left dual sheet hock protector 102B may be detachably attached to the horse left leg 14 by encircling the left horse leg 14 with a combination of the left elastic band 22 and the left front protective sheet 102B, and then coupling the doubled over loop fabric 40 of the second end 22B of the left elastic band 22 into the hook fabric material 38.

Various configurations of the left elastic external fabric 50 preferably extend along a height dimension parallel to the Y-axis to a length of less than one inch to more than nine inches, wherein the left elastic external fabric 50 is chosen having dimensions that are suitably sized and fitted to the horse 4.

The left hock protective sheet 102A is shaped to form the left convex cup 42B that cups and partially encloses the back area of the left hock 2. The first left dart 50A and a second left dart 50B of the left elastic fabric 50 are sewn closed with thread to enable the formation of the left convex cup 42B.

The left elastic fabric 50 and the left elastic band 22 are selected to be elastic in order to expand as the horse 4 moves the left hock 2 through a normal range of motion wherein the hock bone 8 pushes distally away from the central axis H of the left hock 2, while maintaining attachment to the left horse leg 14. The left elastic fabric 50 and the left elastic band 22 are preferably selected, sized and shaped to in combination permit an expansion of up to three inches as the left hock 2 passes through a normal range of motion while maintaining the left hock protector 18 substantially in position and covering at least half of the skin area of the back of the left hock 2.

The left hock protective sheet 102A is asymmetric in shape as bisected by the sagittal plane S of the left hock 2. This asymmetry along the X axis, wherein the left hock protective sheet 102A presents less material toward the inside of the left leg 14, reduces the occurrence of the left hock protector 18 being rubbed against the right horse leg 16 and thereby being pushed away from a position of best protecting the left hock 2. It is understood that to substantially maintain a position by the left hock protector 18 may be defined as where the left elastic band 22 maintains a position no more than four inches above the left hock 2, i.e., in a range of zero to four inches proximal from the left hock 2 along the horse left leg 14.

The left front protective sheet 102B comprises a left front elastic fabric 102B1, a left front hook fabric strip 102B2, a left front absorbent fabric 102B3 and a left front loop fabric strip 102B4. The left front absorbent fabric 102B3 and the left front loop fabric strip 102B4 are presented in FIG. 21. The left hock protective sheet 102A and the left front protective sheet 102B are coupled by the left thread element 102C.

The left front loop fabric strip 102B4 is positioned to removably couple with a left hock protective sheet loop fabric strip 102A1.

FIG. 21 is a back view of the internal side of the left hock protector 102 wherein hook and loop fabric coupling elements 38B, 40A & 102A1 are each exposed wherein the left hock protective sheet loop fabric strip 102A1 and the left front absorbent fabric 102B3 are visually presented. The left front absorbent fabric 102B3 is preferably stitched onto the left front elastic fabric 102B1.

Figure 22:
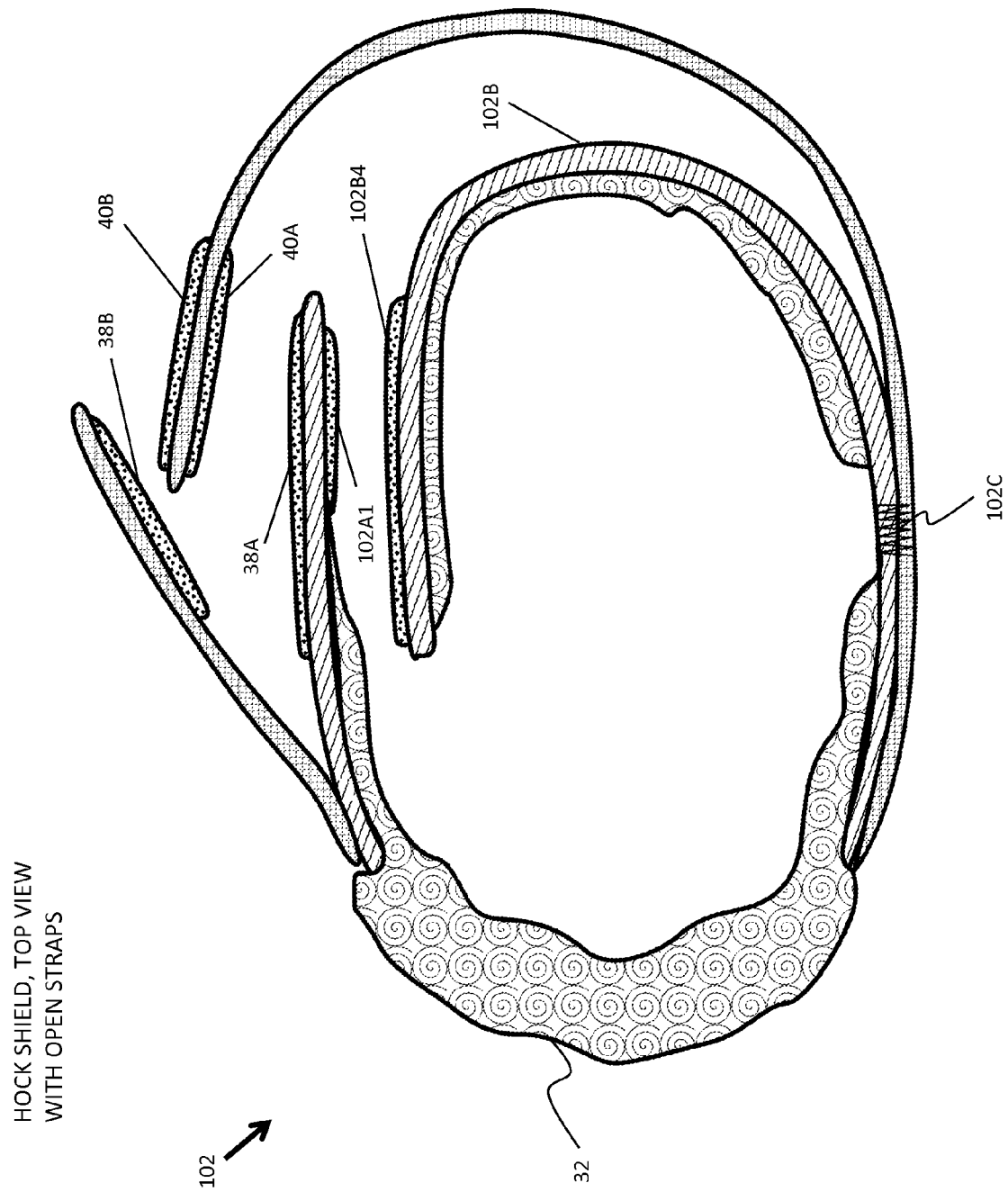
FIG. 22 is a top view of the left hock protective sheet of FIGS. 19 through 21 and the left hock front sheet of FIGS. 19 through 21 are disengaged and uncoupled.

FIG. 22 is a top view of the left hock protective sheet 102A and the left hock front sheet 102B are disengaged and uncoupled.

Figure 23:
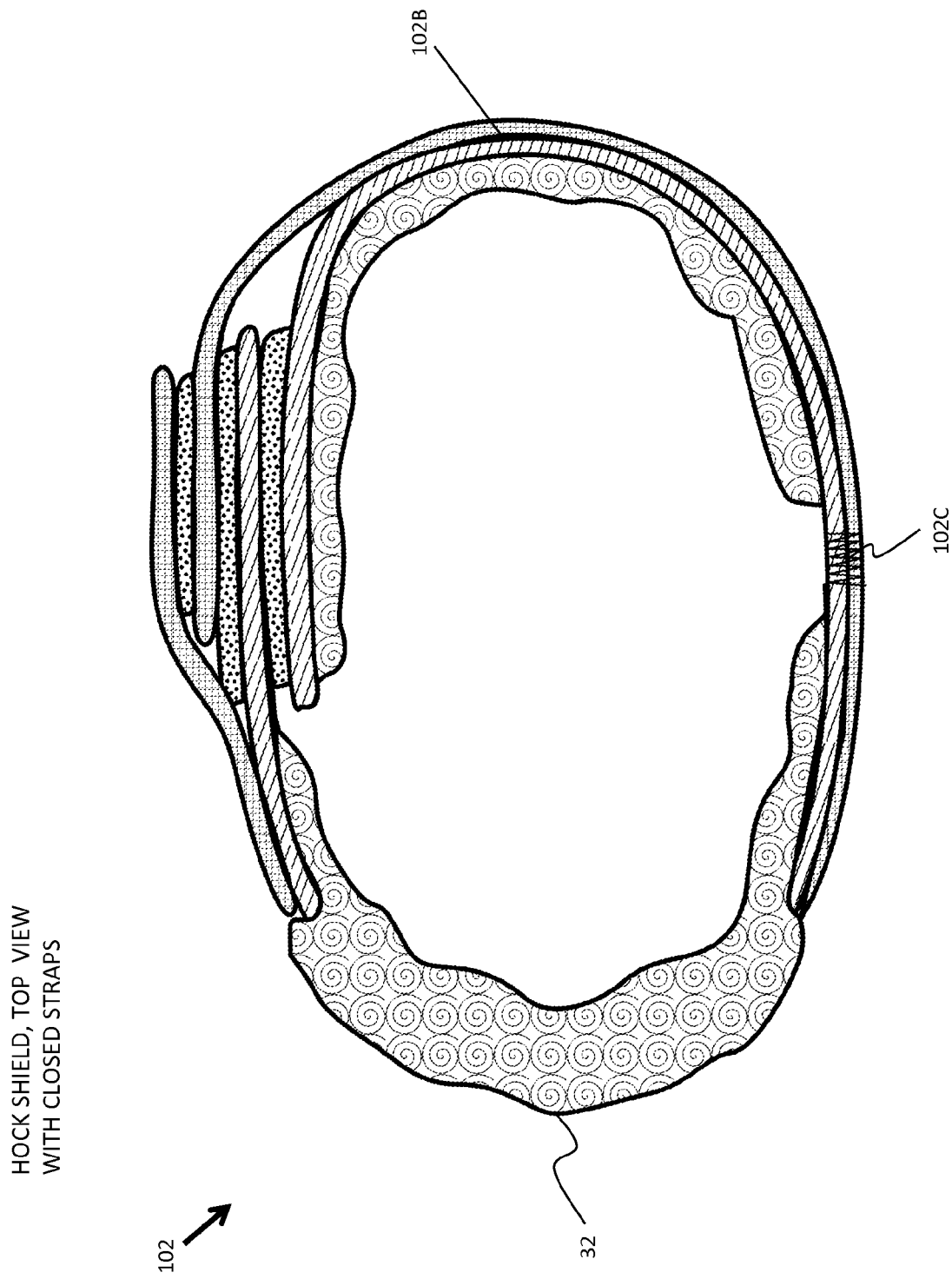
FIG. 23 is a top view of the left hock protective sheet of FIGS. 19 through 22 and the left hock front sheet of FIGS. 19 through 22 are engaged and removabley coupled.

FIG. 23 is a top view of the left hock protective sheet 102A and the left hock front sheet 102B are engaged and removabley coupled.

Figure 24:
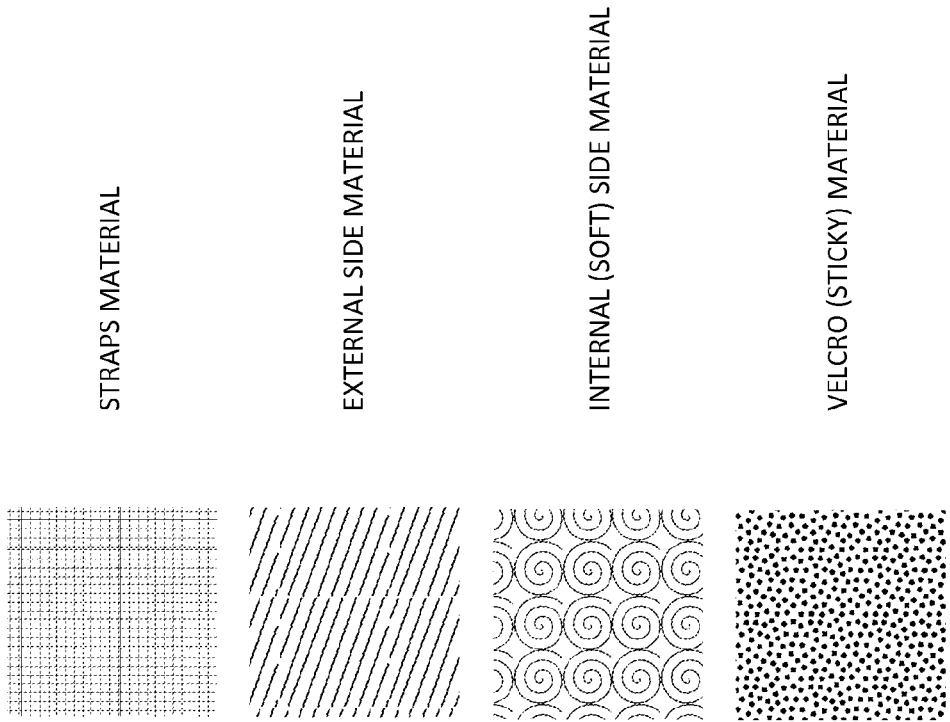
FIG. 24 is a legend of the graphical shading of FIGS. 19 through 23.

FIG. 24 is a legend of the graphical shading of FIGS. 19 through 23.

The foregoing disclosures and statements are illustrative only of the present invention, and are not intended to limit or define the scope of the present invention. The above description is intended to be illustrative, and not restrictive. Although the examples given include many specificities, they are intended as illustrative of only certain possible applications of the present invention. The examples given should only be interpreted as illustrations of some of the applications of the present invention, and the full scope of the Present Invention should be determined by the appended claims and their legal equivalents. Those skilled in the art will appreciate that various adaptations and modifications of the just-described applications can be configured without departing from the scope and spirit of the present invention. Therefore, it is to be understood that the present invention may be practiced other than as specifically described herein. The scope of the present invention as disclosed and claimed should, therefore, be determined with reference to the knowledge of one skilled in the art and in light of the disclosures presented above.

What is claimed is:

1. A hock protector for protecting a posterior surface of a hock of a limb of an animal, the hock protector comprising:
   a. an elastic attachment band, the elastic attachment band adapted to at least partially encircle the animal limb above the hock of the animal limb;
   b. a first protective sheet, the first protective sheet coupled to the elastic attachment band and extending from the elastic attachment band, the first protective sheet adapted to substantially cover the posterior surface of the hock, whereby the elastic attachment band in combination with the first protective sheet are adapted to encircle the animal limb above the hock wherein the first protective sheet extends downward and away from the elastic band;
   c. a second protective sheet, the second protective sheet coupled with the first protective sheet and the elastic attachment band; and
   d. a moisture absorbent lining attached to an inside of the first protective sheet, and the moisture absorbent lining being disposed between the first protective sheet and the hock; wherein the moisture absorbent lining comprises a tongue, and the tongue extends from an inside of the first protective sheet and over a top edge of the first protective sheet, wherein the tongue is gathered and attached to an outside of the first protective sheet by stitching, whereby the gathered moisture absorbent lining is available to flatten when the first protective sheet expands as caused by a movement of the hock.

2. The hock protector of claim 1, wherein the first protective sheet extends away from the elastic attachment band in the range of from one inch to nine inches.

3. The hock protector of claim 1, wherein the first protective sheet extends away from the elastic attachment band in the range of from five inches to eight inches.

4. The hock protector of claim 1, wherein the first protective sheet comprises a material selected from the material group consisting of a neoprene material, a natural fiber, a synthetic fiber, an aromatic polyamide, a para-aramid fiber, a synthetic rubber and an organic rubber.

5. The hock protector of claim 1, wherein the first protective sheet forms a curvilinear shape forming a convex shape that substantially covers a back of the hock.

6. The hock protector of claim 1, wherein the first protective sheet is shaped asymmetrically along a sagittal plane of the hock.

7. The hock protector of claim 6, wherein the first protective sheet forms a curvilinear shape forming a convex shape that substantially covers a back of the hock.

8. The hock protector of claim 1, wherein the elastic attachment band is elastically deformable in the range of from one inch to three inches, whereby a circumference of the hock protector around the animal limb may vary due to movement of the hock in the range of from one to three inches while the elastic band substantially maintains a position above the hock.

9. The hock protector of claim 1, wherein the first protective sheet is elastically deformable in the range of from one quarter inch to three inches, whereby a circumference of the hock protector around the animal limb may vary due to movement of the hock in the range of from less than one inch to three inches, and the elastic band in combination with the first protective sheet substantially maintains a position above the hock.

10. The hock protector of claim 9, wherein the moisture absorbent lining comprises a cushion material.

11. The hock protector of claim 10, wherein the elastic attachment band is elastically deformable in the range of from less than one inch to three inches, whereby a circumference of the hock protector around the animal limb may vary due to movement of the hock in the range of from one to three inches and the elastic band substantially maintains a position above the hock.

12. The hock protector of claim 1, wherein the elastic attachment band is separable by a securing feature.

13. The hock protector of claim 12, wherein the elastic attachment band comprises a first end and a second end, and the first end is attached to the first protective sheet and the second end is detachably attachable to the first protective sheet by the securing feature.

14. The hock protector of claim 13, wherein the securing feature in combination with the elastic band second end comprises a hook and loop fastener assembly.

15. The hock protector of claim 1, wherein the moisture absorbent lining is selected from the lining material group of a natural absorbent fiber, a natural fleece, a synthetic absorbent fiber, a synthetic absorbent fleece, a natural wicking fiber, and a synthetic wicking fiber.

16. The hock protector of claim 1, wherein the first protective sheet is elastically deformable in the range of from one quarter inch to three inches, whereby the gathered absorbent lining flattens as a circumference of the hock protector around the animal limb varies due to movement of the hock, and an expansion of the elastic band in combination with the first protective sheet is not inhibited by the moisture absorbent lining.

17. The hock protector of claim 16, wherein the moisture absorbent lining is selected from the lining material group of a natural absorbent fiber, a natural fleece, a synthetic absorbent fiber, a synthetic absorbent fleece, a natural wicking fiber, and a synthetic wicking fiber.

18. The hock protector of claim 1, wherein the second protective sheet extends away from the elastic attachment band in the range of from one inches to nine inches.

19. The hock protector of claim 1, further comprising a stitching that couples the first protective sheet with the second protective sheet.

\* \* \* \* \*